United States Patent
Lee et al.

(10) Patent No.: US 9,507,460 B2
(45) Date of Patent: Nov. 29, 2016

(54) TOUCH SENSING DEVICE, TOUCH SENSING CIRCUIT, DATA DRIVING CIRCUIT, AND DISPLAY DEVICE DRIVING METHOD

(71) Applicant: LG Display Co., Ltd., Seoul (KR)

(72) Inventors: JeongSeop Lee, Gimje-si (KR); SeongHo Cho, Gumi-si (KR); TaeHoon Kim, Daegu (KR); Takayuki Suzuki, Tokyo (JP); DaeKyu Yi, Gwangmyeong-si (KR); SeongHo Kim, Anyang-si (KR); YoungKyu Shin, Cheongju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/927,480

(22) Filed: Oct. 30, 2015

(65) Prior Publication Data

US 2016/0179273 A1 Jun. 23, 2016

(30) Foreign Application Priority Data

Dec. 22, 2014 (KR) .................. 10-2014-0185809
Sep. 25, 2015 (KR) .................. 10-2015-0136677

(51) Int. Cl.
*G06F 3/044* (2006.01)
*G06F 3/041* (2006.01)
*G06F 1/02* (2006.01)
*G09G 5/00* (2006.01)

(52) U.S. Cl.
CPC ............. *G06F 3/0416* (2013.01); *G06F 1/022* (2013.01); *G06F 3/044* (2013.01); *G06F 3/0412* (2013.01); *G09G 5/00* (2013.01); *G06F 2203/04101* (2013.01); *G06F 2203/04104* (2013.01); *G06F 2203/04106* (2013.01); *G06F 2203/04108* (2013.01); *G06F 2203/04112* (2013.01); *G06F 2203/04803* (2013.01); *G06F 2203/04808* (2013.01)

(58) Field of Classification Search
CPC combination set(s) only.
See application file for complete search history.

(56) References Cited

U.S. PATENT DOCUMENTS

| | | |
|---|---|---|
| 2008/0122798 A1 | 5/2008 | Koshiyama et al. |
| 2009/0309851 A1 | 12/2009 | Bernstein |
| 2013/0009906 A1 | 1/2013 | Posamentier |
| 2013/0050151 A1 | 2/2013 | Tu et al. |
| 2014/0139480 A1 | 5/2014 | Seo et al. |
| 2014/0184543 A1 | 7/2014 | Kim et al. |

(Continued)

FOREIGN PATENT DOCUMENTS

| | | |
|---|---|---|
| KR | 10-2013-0134007 A | 12/2013 |
| KR | 10-2013-0143412 A | 12/2013 |
| KR | 10-2014-0044688 A | 4/2014 |
| KR | 10-2014-0067971 A | 6/2014 |

OTHER PUBLICATIONS

European Partial Search Report, European Application No. 15191408.2, Feb. 25, 2016, 9 pages.
European Extended Search Report, European Application No. 15191408.2, Jun. 28, 2016, 15 pages.

*Primary Examiner* — Robin Mishler
(74) *Attorney, Agent, or Firm* — Fenwick & West LLP

(57) ABSTRACT

The present disclosure provides a touch sensing device, a touch sensing circuit, a data driving circuit, and a display device driving method, which make it possible to activate different sensing areas according to a finger mode and a hover mode, and which activate as many sensing areas as possible simultaneously in a hover mode, which means sensing driving in the case of non-contact with regard to sensing areas, thereby enhancing sensing sensitivity, and improving sensing detection performance even in the hover mode.

27 Claims, 32 Drawing Sheets

(56) References Cited

U.S. PATENT DOCUMENTS

2014/0347321 A1 11/2014 Roziere
2015/0170610 A1* 6/2015 Kurasawa ............... G06F 3/047
    345/174
2015/0179132 A1* 6/2015 Lee ........................ G09G 5/006
    345/174

* cited by examiner

TOUCH SENSING DEVICE, TOUCH SENSING CIRCUIT, DATA DRIVING CIRCUIT, AND DISPLAY DEVICE DRIVING METHOD

CROSS REFERENCE TO RELATED APPLICATIONS

This application claims priority from and the benefit under 35 U.S.C. §119(a) of Republic of Korea Patent Application Number 10-2014-0185809 filed on Dec. 22, 2014 and Republic of Korea Patent Application Number 10-2015-0136677 filed on Sep. 25, 2015, both of which are hereby incorporated by reference for all purposes as if fully set forth herein.

BACKGROUND OF THE INVENTION

1. Field of the Invention

The present invention relates to a touch sensing device, a touch sensing circuit, a data driving circuit, and a display device driving method.

2. Description of the Prior Art

Recently, various user interfaces (UIs) can be implemented by touch sensors provided on display panels having touch functions. Display panels including touch sensors are input/output means capable of both touch-based input functions and information output functions.

Display panels having capacitive touch functions are advantageous in that, compared with existing resistive touch panels, they have better durability and sharpness and capable of multi-touch recognition and proximity touch recognition, thereby being applicable to various applications.

A display panel having a capacitive touch function has a substrate, which includes touch sensors, attached onto the display panel, or the touch sensors are embedded in the display panel (in-cell type); as a result, the display panel is electrically coupled with display elements.

Research has recently been conducted such that display panels having touch functions can recognize touches not only in a contact touch mode such as a finger mode, but also in a non-contact touch mode such as a hover mode or a proximity touch mode. As used herein, the contact touch mode refers to a function for enabling recognition of direct touches made by a pointer with regard to display panels. The non-contact touch mode means that recognition of a proximity touch or a hovering touch, with regard to display panels, is made possible: in the case of the proximity touch, the pointer does not directly touch the display panel, but is in close proximity therewith and, in the case of the hovering touch, the pointer hovers over the touch panel.

Touch functions in the hover mode, among them, with regard to a display panel including touch sensors of the in-cell type have not yet been implemented.

SUMMARY OF THE INVENTION

It is an aspect of the present invention to provide a touch sensing device for maintaining excellent touch recognition sensitivity in a display panel, which includes in-cell-type touch sensors, thereby enabling touch recognition in a hover mode.

In one embodiment, a touch integrated display device as well as a driver circuit or method for driving such a touch integrated display device are provided. The touch integrated display device, comprises a display panel including a plurality of touch electrodes, the display panel operated in a display period of a frame or a touch period of the frame, and a touch driver circuit to provide a common voltage to the touch electrodes during the display period and to drive the touch electrodes with a touch drive signal during the touch period to detect a touch sensing signal responsive to a touch from the touch electrodes. In a first touch mode, the touch driver circuit drives a first number of the touch electrodes with the touch drive signal during the touch period. In a second touch mode, the touch driver circuit drives a second number of the touch electrodes with the touch drive signal during the touch period, the second number of the touch electrodes being greater than the first number of the touch electrodes.

For example, the first touch mode may be a contact touch mode in which the touch is a physical contact made with the touch integrated display device. The second touch mode may be a non-contact touch mode in which the touch does not make physical contact with the touch integrated display device but is within a predetermined distance from the touch integrated display device. The touch in the non-contact touch mode may be hovering over the touch integrated display device.

In the first touch mode, the touch drive signal has a reference waveform. In the second touch mode, the touch drive signal may mimic the reference waveform but an amplitude of the touch drive signal in the second touch mode is overdriven by an overdrive amplitude with respect to the reference waveform during an overdrive duration. For example, the reference waveform is a pulse waveform periodically alternating between a high level and a low level, and the touch drive signal in the second touch mode has pulses with two or more different high voltage levels during the high level and two or more different low voltage levels during the low level.

In another embodiment, a load-free driving signal having the same phase or amplitude as the touch drive signal is driven to one or more data lines or one or more gate lates of the display panel, while the touch driver circuit drives the second number of the touch electrodes with the touch drive signal in the second touch mode.

It is still another aspect of the present invention to provide a touch sensing device, a touch sensing circuit, a data driving circuit, and a display device driving method, which can perform touch driving suitable for each of a contact touch and a non-contact touch.

According to an aspect, the present invention may provide a touch sensing device including: a display panel comprising multiple touch sensors; a sensing signal detection unit configured to supply a driving signal for touch recognition to the multiple touch sensors and detect a sensing signal through the multiple touch sensors; and a selection circuit configured to electrically connect different numbers of touch sensors to the sensing signal detection unit with regard to a case of contact touch driving and a case of non-contact touch driving, wherein the driving signal supplied to the multiple touch sensors in the case of non-contact touch driving has a signal intensity larger than the driving signal supplied to the multiple touch sensors in the case of contact touch driving.

According to another aspect, the present invention may provide a touch sensing circuit including: a sensing signal detection unit configured to successively output a driving signal to be applied to multiple touch sensors and detect a sensing signal through the multiple touch sensors; and a selection circuit configured to electrically connect different numbers of touch sensors to the sensing signal detection unit with regard to a case of contact touch driving and a case of non-contact touch driving, wherein the driving signal output in the case of non-contact touch driving has a signal intensity larger than the driving signal output in the case of contact touch driving.

According to another aspect, the present invention may provide a touch sensing circuit electrically connected to multiple touch sensors arranged on a display panel, configured to successively supply a driving signal to the multiple touch sensors during a touch driving mode, configured to supply a driving signal to one touch sensor at a specific timing in the case of contact touch driving, and configured to supply a driving signal to two or more touch sensors at a specific timing in the case of non-contact touch driving, and the driving signal in the case of non-contact touch driving has an overdriving period.

According to another aspect, the present invention may provide a touch sensing circuit electrically connected to multiple touch sensors arranged on a display panel through multiple sensing lines, configured to successively supply a driving signal to the multiple touch sensors during a touch driving mode, and configured to supply a driving signal having an overdriving period to two or more touch sensors together at a specific timing.

According to another aspect, the present invention may provide a touch sensing circuit electrically connected to multiple touch sensors arranged on a display panel, configured to detect whether a touch occurs or not by successively supplying a driving signal to the multiple touch sensors during touch driving, configured to detect whether a touch occurs or not with regard to each sensing area, which corresponds to one touch sensor, in the case of contact touch driving, configured to detect whether a touch occurs or not with regard to each block, which corresponds to two or more touch sensors, in the case of non-contact touch driving, and configured to supply, in the case of non-contact touch driving, a driving signal having a signal intensity larger than in the case of contact touch driving.

According to another aspect, the present invention may provide a data driving circuit electrically connected to multiple data lines arranged on a display panel, electrically connected to multiple touch sensors arranged on the display panel, configured to output a data voltage to the multiple data lines during a display driving mode, configured to successively supply a driving signal to the multiple touch sensors during a touch driving mode, configured to supply a driving signal to one touch sensor at a specific timing in the case of contact touch driving, configured to supply a driving signal to two or more touch sensors at a specific timing in the case of non-contact touch driving, and configured to supply, in the case of non-contact touch driving, a driving signal having a signal intensity larger than in the case of contact touch driving.

According to another aspect, the present invention may provide a data driving circuit electrically connected to multiple data lines arranged on a display panel, electrically connected to multiple touch sensors arranged on the display panel through multiple sensing lines, configured to output a data voltage to the multiple data lines during a display driving mode, configured to successively supply a driving signal to the multiple touch sensors during a touch driving mode, and configured to supply a driving signal having an overdriving period to two or more touch sensors at a specific timing.

According to another aspect, the present invention may provide a data driving circuit electrically connected to multiple data lines arranged on a display panel, electrically connected to multiple touch sensors arranged on the display panel, configured to output a data voltage to the multiple data lines during a display driving mode, configured to detect whether a touch occurs or not by successively supplying a driving signal to the multiple touch sensors during touch driving, configured to detect whether a touch occurs or not with regard to each sensing area, which corresponds to one touch sensor, in the case of contact touch driving, configured to detect whether a touch occurs or not with regard to each block, which corresponds to two or more touch sensors, in the case of non-contact touch driving, and configured to supply, in the case of non-contact touch driving, a driving signal having a signal intensity larger than in the case of contact touch driving.

According to another aspect, the present invention may provide a method for driving a display device including a display panel on which multiple data lines and multiple gate lines are arranged, a data driving circuit configured to drive multiple data lines, and a gate driving circuit configured to drive multiple gate lines, the method including: outputting a data voltage to the multiple data lines during a display driving mode; and supplying a driving signal successively to the multiple touch sensors embedded in the display panel during a touch driving mode, wherein, in the supplying a driving signal, a driving signal is supplied to one touch sensor at a specific timing in the case of contact touch driving, a driving signal is supplied to two or more touch sensors at a specific timing in the case of non-contact touch driving, and a driving signal having a signal intensity larger than the case of contact touch driving is supplied in the case of the non-contact touch driving.

Advantageous effects of a terminal according to the present invention will now be described.

In addition, according to at least one of embodiments of the present invention, there is an advantage in that, since both a finger mode and a sensing mode can be driven, touch detection is possible not only by a direct touch by the user, but also by an indirect touch, i.e. non-contact touch, thereby expanding the range of use of the touch sensing device.

In addition, according to at least one of embodiments of the present invention, multiple sensing areas in each sensing area block can be activated successively in the finger mode. In the finger mode, the user's direct contact occurs in the sensing areas, and, even if each sensing area is individually activated, sufficiently large capacitance of each sensing area makes it possible to detect whether the user's touch has occurred or not through each sensing area.

In the hover mode, on the other hand, it is possible to detect whether a touch has occurred or not while maintaining the user's finger at a predetermined distance from the sensing areas without contacting them. In this case, as the distance between the sensing areas and the user's finger increases, the capacitance of respective sensing areas decreases noticeably compared with the finger mode. The present invention is advantageous in that multiple sensing areas are activated to make it possible to sufficiently sense whether a touch has occurred or not even in the hover mode, and the increased capacitance of the total sensing areas improves the sensing capability.

According to the present invention, it is possible to provide a touch sensing device, a touch sensing circuit, and a data driving circuit, which can perform touch driving suitable for each of a contact touch and a non-contact touch.

The additional range of applicability of the present invention will become clear from the following detailed description. However, various changes and modifications within the idea and scope of the present invention can be clearly understood by a person skilled in the art, and it is to be understood that the detailed description and specific embodiments, such as preferred embodiments, of the present invention are given only as examples.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
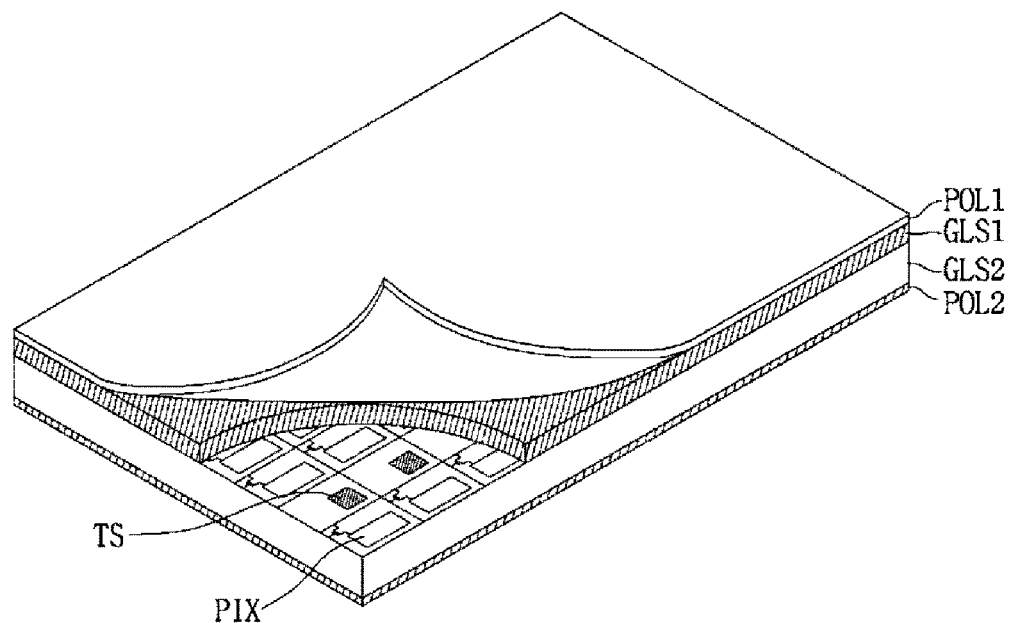
FIG. 1 is a diagram illustrating a touch sensor having touch sensors embedded in a display panel according to an embodiment of the present invention.

Hereinafter, embodiments disclosed in the specification will be described in detail with reference to the accompanying drawings, and the same or similar elements will given the same reference numerals throughout the drawings, and repeated descriptions thereof will be omitted herein. The suffixes of component elements used in the following descriptions, such as, a "module" and a "unit", are assigned or used together only for ease of description, but they do not have distinguishing meanings or roles. Further, in the following description of the present invention, a detailed description of known technologies incorporated herein will be omitted when it may make the subject matter of the present disclosure rather unclear. In addition, it is to be understood that the accompanying drawings are only for better understanding of embodiments disclosed in the specification, and does not limit the technical idea disclosed in the specification, and includes all changes, equivalents, and substitutes included in the idea and technical scope of the present invention.

A display device according to the present invention provides a touch mode, and the touch mode can be largely divided into a contact touch mode and a non-contact touch mode.

The contact touch mode refers to a mode in which a touch made by directly contacting a display panel is recognized, and is also referred to as a finger mode.

The non-contact touch mode refers to a mode in which a touch on the display panel, without directly contacting the same, is recognized, and may include a proximity touch mode, in which a proximity touch, without contacting the display panel, is recognized, and a hovering mode, in which hovering over the display panel is recognized.

In addition, the display device according to the present invention may be implemented on the basis of a flat panel display device, such as a Liquid Crystal Display (LCD), a Field Emission Display (FED), a Plasma Display Panel (PDP), an Organic Light Emitting Display (OLED), an ElectroPhoresis Display (EPD), etc.

It is to be noted that, although the display device will be described in the following embodiments with reference to an LCD as an example of the flat panel display device, the display device according to the present invention is not limited to the LCD.

The LCD according to the present invention may include touch sensors (TS) as illustrated in FIG. 1; that is, the touch sensors (TS) may be embedded in a pixel array of the LCD panel. In FIG. 1, "PIX" refers to a pixel electrode of a pixel, "GLS1" refers to an upper substrate, "GLS2" refers to a lower substrate, and "POL2" refers to a lower polarization plate.

The LCD panel may have multiple pixels arranged thereon. Each pixel may include R, G, B sub-pixels or R, G, B, W sub-pixels, but is not limited thereto.

The upper substrate GLS1 may include R, G, B color filters corresponding to the sub-pixels of each pixel or may have a color filter layer including R, G, B, W color filters.

The touch sensors TS may be arranged on respective pixels or arranged on respective sub-pixels, but are not limited thereto.

Each pixel may have a thin-film transistor and a pixel electrode arranged thereon, the thin-film transistor making it possible to select each pixel, and the pixel electrode being electrically connected to the thin-film transistor.

The touch sensors TS may be capacitive touch sensors TS, which sense a change of capacitance caused by a touch, but are not limited thereto.

The touch sensors TS may sense a change of capacitance resulting not only from a direct touch with regard to the upper surface of the upper substrate GLS1, but also from a non-contact (proximity or hovering) with regard to the upper surface of the upper substrate (GLS1) and may determine whether a touch has occurred or not on the basis of the result of sensing.

As used herein, hovering may refer to a state in which the distance from the upper surface of the upper substrate GLS1 is larger than in the case of proximity.

Display panels including capacitive touch sensors TS are classified into self-capacitance types and mutual capacitance types. The self-capacitance is formed along a single layer of conductor wiring formed in one direction. The mutual capacitance is formed between two perpendicular layers of conductor wiring.

Figure 2:
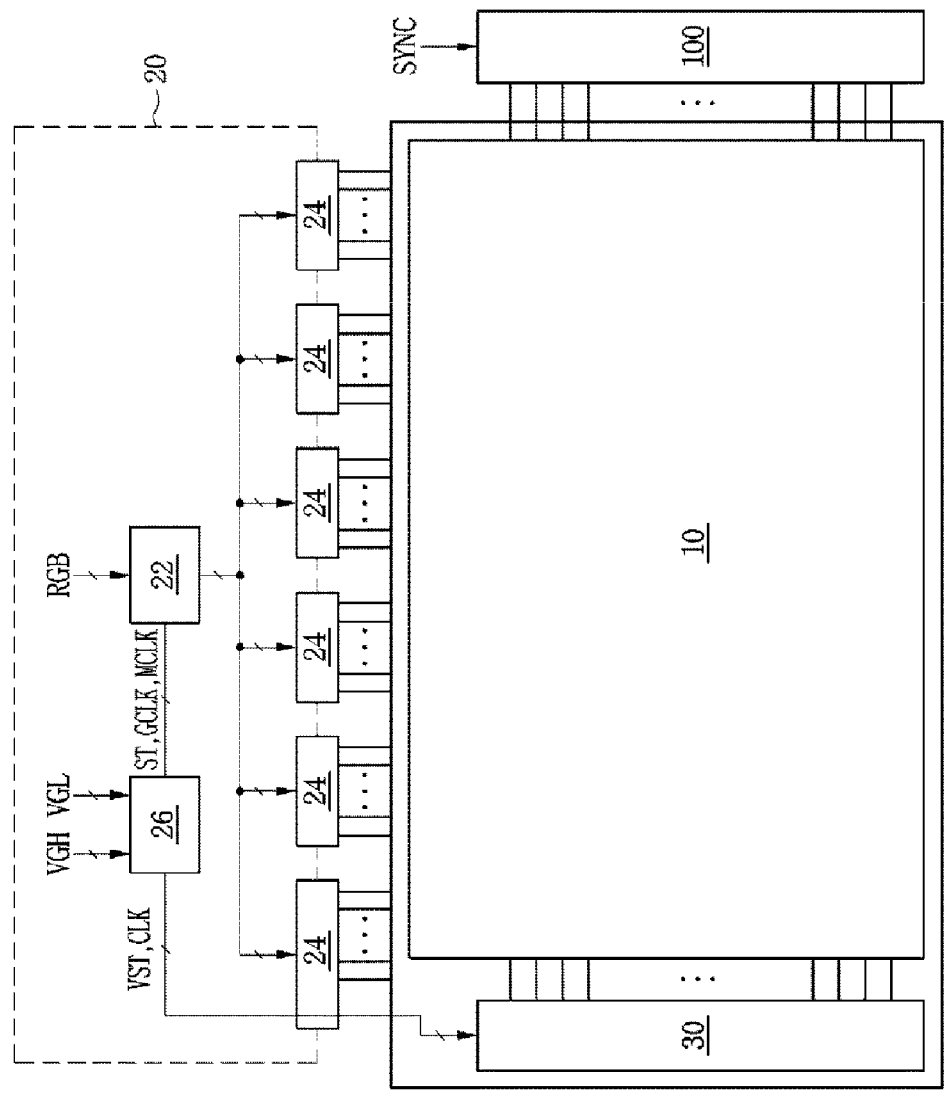
FIG. 2 is a block diagram illustrating a display device according to an embodiment of the present invention.
Figure 3:
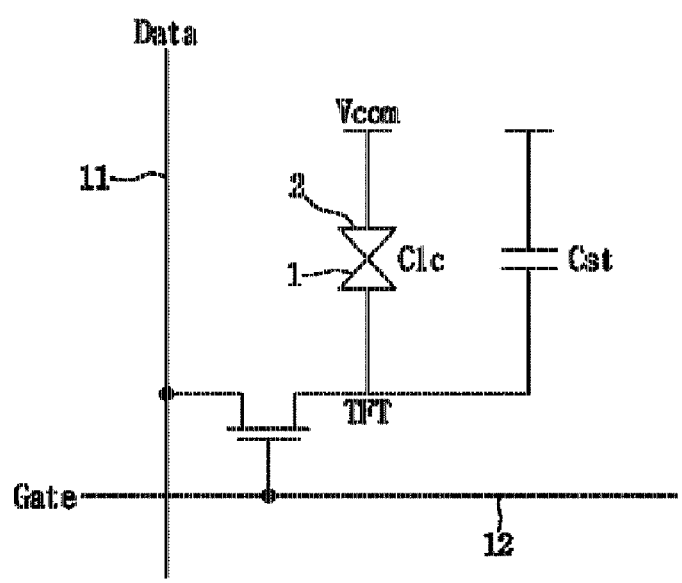
FIG. 3 is an equivalent circuit diagram of a liquid crystal cell.

FIG. 2 is a block diagram illustrating a display device according to an embodiment of the present invention, and FIG. 3 is an equivalent circuit diagram of a liquid crystal cell.

Referring to FIG. 2 and FIG. 3, the display device according to the present invention includes a display panel 10, a display panel driving circuit, a timing controller 22, and a touch sensing circuit 100.

The display panel 10 may be a self-capacitive display panel of an in-cell type, which has touch sensors TS embedded therein, as illustrated in FIG. 1.

The display panel 10 includes a liquid crystal layer formed between two substrates GSL1 and GLS2. The substrates may be fabricated as glass substrates, plastic substrates, film substrates, etc. A pixel array formed on the lower substrate GLS2 of the display panel 10 includes data lines 11, gate lines 12 extending perpendicular to the data lines 11, and pixels arranged in a matrix type. The pixel array further includes multiple TFTs (Thin Film Transistors) formed at intersections between the data lines 11 and the gate lines 12, pixel electrodes 1 for charging the pixels with a data voltage, storage capacitors Cst connected to the pixel electrodes 1 to maintain the pixel voltage, etc.

The pixels of the display panel 10 are arranged in a matrix defined by the data lines 11 and the gate lines 12. The liquid crystal cells Clc of respective pixels are driven by an electric field applied according to the voltage difference between a data voltage, which is applied to the pixel electrodes 1, and a common voltage, which is applied to common electrodes 2, and adjust the amount of transmission of incident light. The TFTs are turned on in response to a gate pulse from the gate lines 12 and supply the pixel electrodes 1 of the liquid crystal cells Clc with the voltage from the data lines 11. The common electrodes 2 may be formed on the lower substrate GLS2 or the upper substrate GLS1.

The upper substrate GLS1 of the display panel 10 may include a black matrix, a color filter, etc. Polarization plates POL1 and POL2 are attached to the upper and lower substrates GLS1 and GLS2 of the display panel 10, respectively, and an orientation film (not illustrated) is formed on an inner surface, which contacts the liquid crystal, in order to set the free tilt angle of the liquid crystal. A spacer (not illustrated) may be formed between the upper and lower substrates GLS1 and GLS2 of the display panel 10 in order to maintain the cell gap of the liquid crystal cells Clc, but is not limited in any manner.

The display panel 10 may be implemented in any of widely known liquid crystal modes, such as a TN (Twisted Nematic) mode, a VA (Vertical Alignment) mode, an IPS (In Plane Switching) mode, a FFS (Fringe Field Switching) mode, etc.

A backlight unit (not illustrated) may be arranged on the rear surface of the display panel 10. The backlight unit is implemented as an edge-type or direct-type backlight unit and emits light to the display panel 10.

The display panel driving circuit writes data regarding input images in the pixels of the display panel 10 using a data driving circuit 24 and gate driving circuits 26 and 30.

The data driving circuit 24 generates a data voltage by converting digital video data RGB, which is input from the timing controller 22, using an analog positive/negative gamma compensation voltage. The data driving circuit 24 supplies the data lines 11 with the data voltage under the control of the timing controller 22 and reverses the polarity of the data voltage.

The gate driving circuits 26 and 30 successively supply the gate lines 12 with a gate pulse (or scan pulse), which is synchronized with the data voltage, and select a line of the display panel 10 in which the data voltage is written.

The gate driving circuits include a level shifter 26 and a shift register 30. In line with the developing GIP (gate in panel) process technology, the shift register 30 may be directly formed on the substrate of the display panel 10.

The level shifter 26 may be formed on a printed circuit board (hereinafter, referred to as a PCB) 20 electrically connected to the lower substrate GLS2 of the display panel 10 together with the timing controller 22. The level shifter 26 outputs a start pulse VST, which swings between a gate high voltage VGH and a gate low voltage VGL, and at least one clock signal CLK under the control of the timing controller 22. The gate high voltage VGH may be set as a voltage equal to or higher than the threshold voltage of the TFTs formed in the pixel array of the display panel 10. The gate low voltage VGL may be set as a voltage equal to or lower than the threshold voltage of the TFTs formed in the pixel array of the display panel 10. The level shifter 26 outputs a start pulse VST and at least one clock signal CLK, which swing between the gate high voltage VGH and the gate low voltage VGL, respectively, in response to a start pulse ST, a first clock GCLK, and a second clock MCLK, which are input from the timing controller 22. The at least one clock signal CLK output from the level shifter 26 successively undergoes phase shift and is transmitted to the shift register 30 formed on the display panel 10.

The shift register 30 may be arranged on an edge of the lower substrate GLS2 of the display panel 10, on which a pixel array is formed, so as to be connected with the gate lines 12 of the pixel array. The shift register 30 may include multiple stages connected subordinately.

The shift register 30 starts operating in response to a start pulse VST input from the level shifter 26, shifts output in response to clock signals CLK, and successively supplies the gate lines 12 of the display panel 10 with a gate pulse.

The timing controller 22 may supply the data driving circuit 24 with digital video data, which is input from an external host system. The data driving circuit 24 may be manufactured as an IC (Integrated Circuit) and mounted on a chip-on-board or a chip-on-film.

The timing controller 22 may receive timing signals input from the external host system, such as a vertical synchronization signal Vsync, a horizontal synchronization signal Hsync, a data enable DE signal, a clock, etc., and generate timing control signals for controlling the operation timing of the data driving circuit 24 and the gate driving circuits 26 and 30. The timing controller 22 or the host system generates a synchronization signal SYNC (refer to FIG. 4) for controlling the operation timing of the display panel driving circuit and the touch sensing circuit 100.

The touch sensing circuit 100 may apply a driving signal to wirings connected to the touch sensors TS and count the change in driving signal voltage before and after the touch or the rising or falling edge delay time of the driving signal, thereby sensing the change in capacitance before and after input of the touch (or proximity). The touch sensing circuit 100 converts a voltage received from the touch sensors TS into digital data, thereby generates touch raw data, executes a preset touch recognition algorithm, analyzes the touch raw data, and detects a touch (or proximity) input. The touch sensing circuit 100 transmits touch report data, including coordinates of touch (or proximity) input positions, to the host system.

The host system may be implemented as one of a navigation system, a set-top box, a DVD player, a Blue ray player, a PC, a home theater system, a broadcast receiver, and a phone system. The host system converts digital video data regarding input images into a format, which conforms to the resolution of the display panel 10, using a scaler and transmits the data and a timing signal to the timing controller 22. In addition, the host system executes an application program associated with a touch (or proximity) input in response to the touch report data input from the touch sensing circuit 100.

Figure 4:
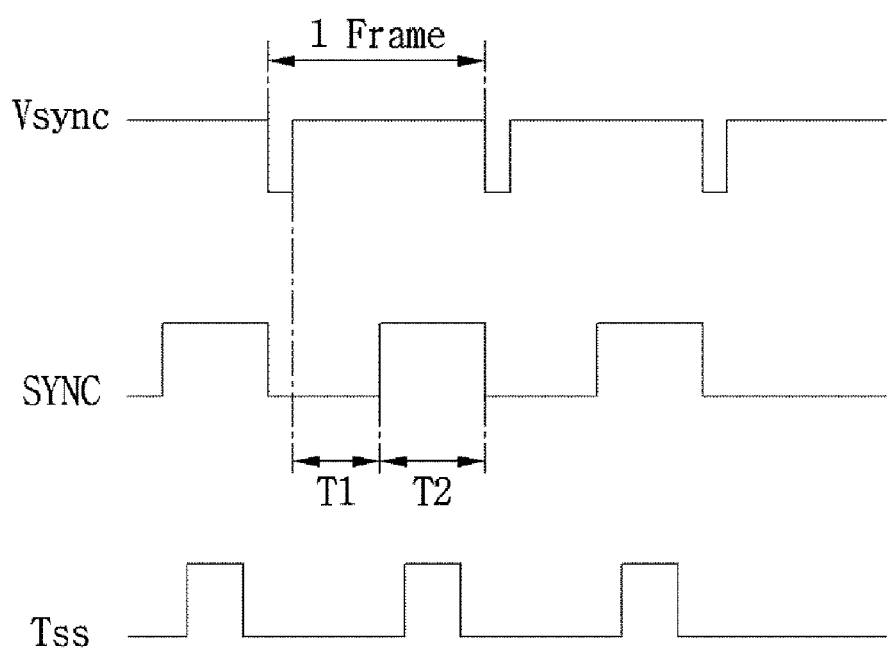
FIG. 4 is a waveform diagram of a vertical synchronization signal illustrating a method for time division driving of a display panel and a touch sensor.

The display 10, which has touch sensors TS embedded therein, and the touch sensing circuit 100 may be time-division-driven according to a method as illustrated in FIG. 4. One frame period, as illustrated in FIG. 4, may be time-divided into a display panel driving period T1 and a touch driving period T2.

In FIG. 4, "Vsync" refers to a first vertical synchronization signal input to the timing controller 22, and "SYNC" refers to a second vertical synchronization signal input to the touch sensing circuit 100. The timing controller 22, in order to define a display panel driving period T1 and a touch driving period T2 in one frame period, may modulate the first vertical synchronization signal Vsync input from the host system and thereby generate a second vertical synchronization signal SYNC. In a different embodiment, the host system may generate a second vertical synchronization signal SYNC as illustrated in FIG. 4, and the timing controller 22 may control the display panel driving period T1 and the touch driving period T2 in response to the second vertical synchronization signal SYNC input from the host system. Therefore, according to the present invention, one frame period may be time-divided into a display panel driving period T1 and a touch driving period T2 such that, as a controller that controls the operation timing of the display panel driving circuit and the touch sensing circuit 100, one of the timing controller 22 and the host system may be used.

The display panel driving period T1 may be defined in the low logic level section of the second vertical synchronization signal SYNC, and the touch driving period T2 may be defined in the high logic level section of the second vertical synchronization signal SYNC, but the present invention is not limited thereto. For example, the display panel driving period T1 may be defined in the high logic level section of the second vertical synchronization signal SYNC, and the touch driving period T2 may be defined in the low logical level section of the second vertical synchronization signal SYNC.

During the display panel driving period T1, the display panel driving circuit is driven, while the touch sensing circuit 100 is not driven. During the display panel driving period T1, the data driving circuit 24 supplies the data lines 11 with a data voltage under the control of the timing controller 22, and the gate driving circuits 26 and 30 successively supplies the gate lines 12 with a gate pulse. The touch sensing circuit 100, during the display panel driving period T1, does not supply the touch sensors TS of the display panel 10 with a driving signal.

During the touch driving period T2, the display panel driving circuit is not driven, while the touch sensing circuit 100 is driven. The touch sensing circuit 100 applies a driving signal to the touch sensors TS within the touch driving period T2.

Figure 5:
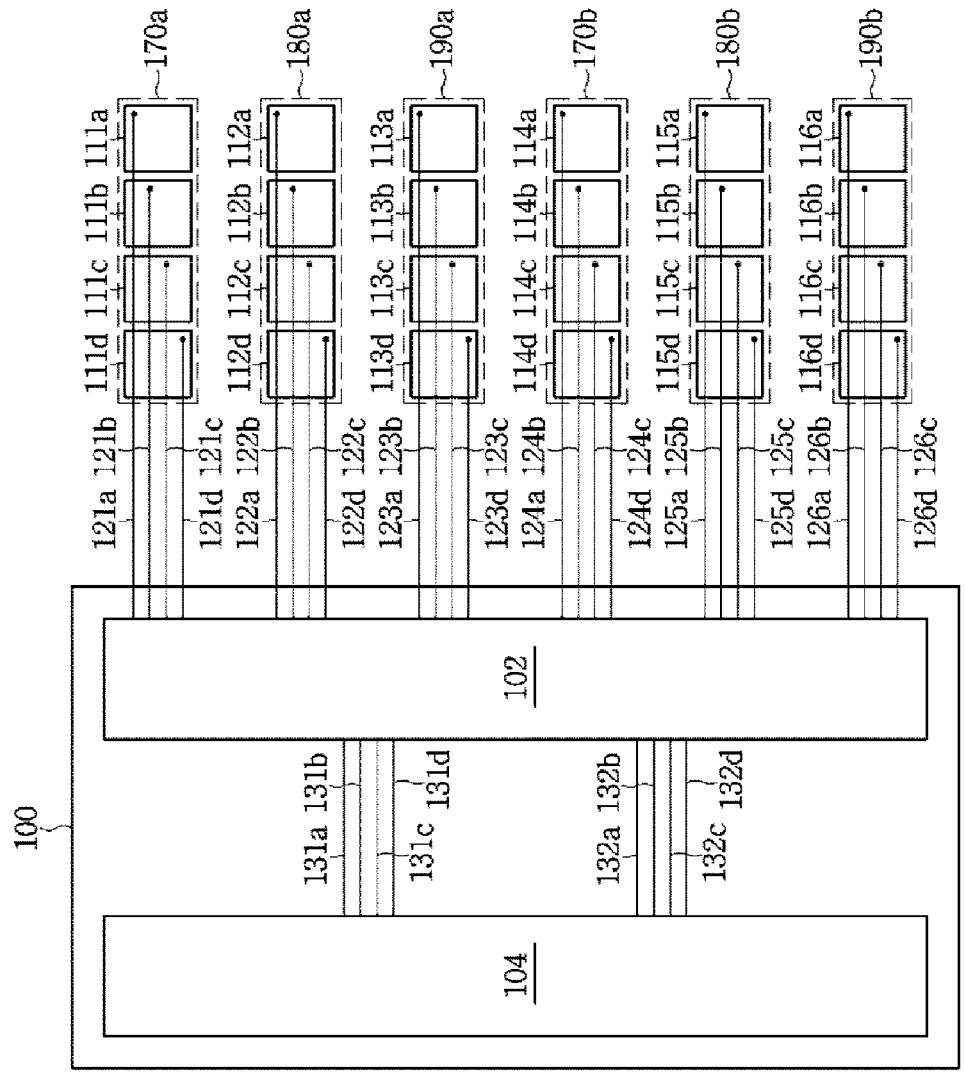
FIG. 5 is a diagram illustrating a touch sensing device according to the present invention.

Touch sensors TS in sensing areas 111, 112, 113, 114, 115, and 116 (FIG. 5) may be connected to sensing lines 121, 122, 123, 124, 125, and 126 (FIG. 5). For example, sensing lines 121, 122, 123, 124, 125, and 126 may be arranged in parallel with gate lines 12, but are not limited thereto.

One touch sensor may be formed in each sensing area, or multiple touch sensors may be formed in each sensing area.

Each sensing area may correspond to multiple pixels, but the present invention is not limited thereto. One touch sensor may be formed in each pixel, or one touch sensor may be formed in multiple pixels.

An in-cell-type touch display panel 10, which has touch sensors TS embedded in the display panel 10 as illustrated in FIG. 1, is more sensitively influenced by variation of load of the display panel or change in parasitic capacitance, compared with a scheme in which touch sensors TS are attached on the display panel.

Hereinafter, the wiring structure of an in-cell-type display panel 10 and a method for driving the same will be described.

Figure 6:
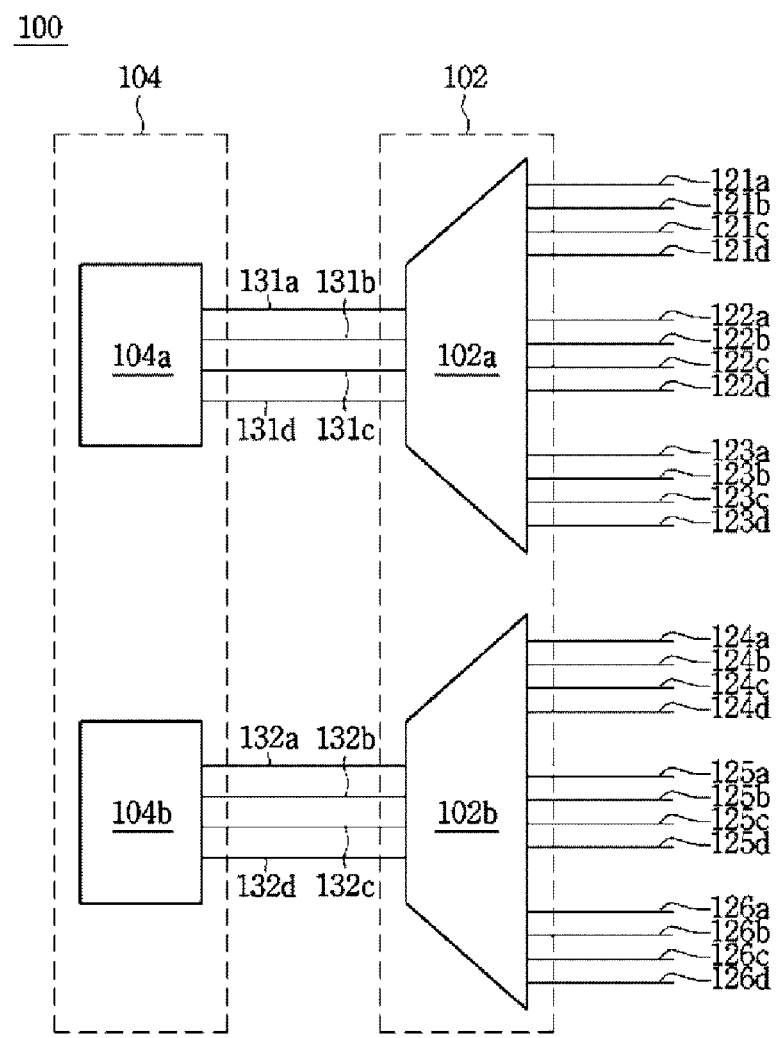
FIG. 6 is a diagram illustrating a selection circuit of FIG. 5 in detail.

FIG. 5 is a diagram illustrating a touch sensing device according to the present invention, and FIG. 6 is a diagram illustrating a selection circuit of FIG. 5 in detail.

The touch sensing device illustrated in FIG. 5 may be a part of the display device illustrated in FIG. 2.

Referring to FIG. 5, the touch sensing device according to the present invention may include an in-cell-type, self-capacitive display panel 10.

The display panel 10 may include multiple sensing areas 111 to 116. Respective sensing area 111 to 116 may be made of a transparent conductive material, such as ITO, but the present invention is not limited thereto. Respective sensing area 111 to 116 may be arranged on the same layer as the pixel electrodes 1, for example, but the present invention is not limited thereto.

Respective sensing areas 111 to 116 may be connected to the touch sensors TS illustrated in FIG. 1.

The size of respective sensing areas 111 to 116 may be at least larger than the pixel size. In other words, the size of one sensing area may correspond to the entire size of multiple pixels. For example, respective sensing area 111 to 116 may correspond to at least three pixels, but the present invention is not limited thereto. That is, one sensing area may be defined with regard to at least three pixels. The number of pixels, the entire size of which corresponds to the size of one sensing area, can be optimized through experiments.

Respective sensing areas 111 to 116 may be used as touch electrodes during the touch driving period T2, for example, and used as common electrodes during the display panel driving period T1, for example.

The touch sensing circuit 100 may be disabled during the display panel driving period T1 and enabled during the touch driving period T2, thereby supplying sensing areas 111 to 116 with a driving signal (refer to FIG. 12) via sensing lines 121, 122, 123, 124, 125, and 126 during the touch driving period T2.

A common voltage generated by a common voltage generation unit (not illustrated) may be supplied to the sensing areas 111 to 116 via the sensing lines 121, 122, 123, 124, 125, and 126 during the display panel driving period T1. Therefore, images can be displayed on the display panel 10 by means of a liquid crystal displacement resulting from the difference in electric potential between the common voltage supplied to the sensing areas 111 to 116 and the data voltage supplied to the pixel electrodes 1.

During the touch driving period T2, driving signals S1 to S4 (refer to FIG. 12) generated from the touch sensing circuit 100 may be supplied to the sensing areas 111 to 116. As a result, corresponding sensing areas 111 to 116 are activated; and, when a touch regarding the corresponding sensing areas 111 to 116 is input from the user, the capacitance connected to the corresponding sensing areas 111 to 116 is changed, and a sensing signal, which occurs as the changed capacitance is reflected in the driving signals S1 to S4, may be detected and provided to the touch sensing circuit 100.

A sensing area including at least one touch sensor TS may be electrically connected to a corresponding sensing line.

Figure 12:
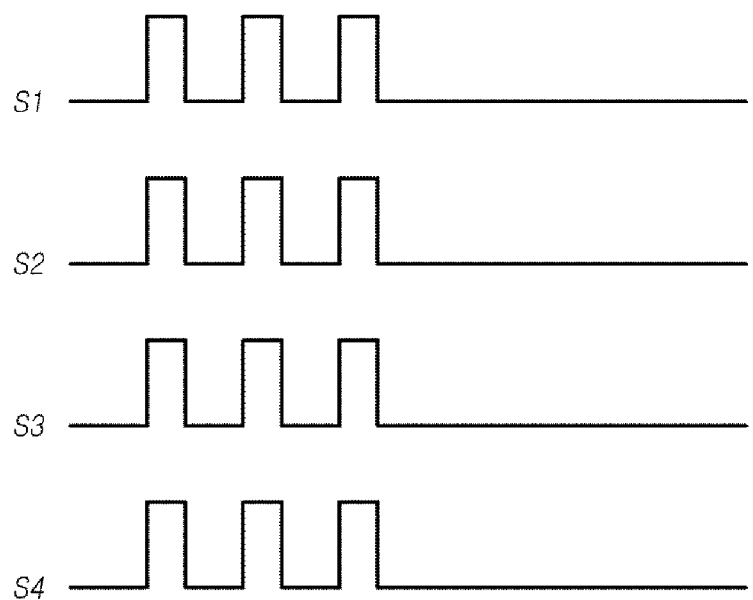
FIG. 12 is a waveform diagram illustrating a driving signal for sensing a display panel in a touch sensing device according to the present invention.

Driving signals S1 to S4, as illustrated in FIG. 12, are supplied to the sensing areas 111 to 116 via the sensing lines 121, 122, 123, 124, 125, and 126, and a change of capacitance, which occurs according to whether the user touches the sensing areas 111 to 116 or not, is provided to the touch sensing circuit 100 via the sensing lines 121, 122, 123, 124, 125, and 126, thereby enabling touch recognition.

Multiple sensing areas 111 to 116 may be distinguished by multiple sensing area blocks 170, 180, and 190. For example, multiple sensing areas 111 to 116 arranged along the longitudinal direction of the sensing lines 121, 122, 123, 124, 125, and 126 may be defined as one sensing area block.

In this case, first to sixth sensing area blocks 170a, 180a, 190a, 170b, 180b, and 190b may be provided as illustrated in FIG. 5. Although six sensing blocks 170a, 180a, 190a, 170b, 180b, and 190b, each of which includes four sensing areas, are illustrated in FIG. 5 for convenience of description, more than six sensing area blocks, each of which includes more than four sensing areas, may be included according to the present invention.

As illustrated in FIG. 5, the first sensing area block 170a may include four sensing areas 111a, 111b, 111c, and 111d, and respective sensing areas 111a, 111b, 111c, and 111d may be connected to corresponding sensing lines 121a, 121b, 121c, and 121d.

On the other hand, the touch sensing circuit 100 may include a sensing signal detection unit 104 and a selection circuit 102.

The sensing signal detection unit 104 may supply driving signals S1 to S4, illustrated in FIG. 12, to respective sensing area blocks 170a, 180a, 190a, 170b, 180b, and 190b on the display panel 10 or to respective sensing areas 111 to 116 and receive sensing signals resulting from sensing by respective sensing area blocks 170a, 180a, 190a, 170b, 180b, and 190b or by respective sensing areas 111 to 116.

The selection circuit 102 may successively select multiple sensing areas 111 to 116 included in respective sensing area blocks 170a, 180a, 190a, 170b, 180b, and 190b or simultaneously select at least two sensing areas from multiple sensing areas 111 to 116 included in respective sensing area blocks 170a, 180a, 190a, 170b, 180b, and 190b.

For example, in the case of a finger mode, the selection circuit 102 may select a first sensing area 111a included in a first sensing area block 170a during the first period of the touch driving period T2 and may select a second sensing area 111b included in the first sensing area block 170a during the second period of the touch driving period T2. Thereafter, the selection circuit 102 may select a third sensing area 111c included in the first sensing area block 170a during the third period of the touch driving period T2 and may select a fourth sensing area 111d included in the first sensing area block 170a during the fourth period of the touch driving period T2. After all sensing areas 111a, 111b, 111c, and 111d inside the first sensing area block 170a have been selected successively, all sensing areas 112a, 112b, 112c, and 112d included in the second sensing area block 180a may be selected successively. In this manner, all sensing areas 113a to 113d, 114a to 114d, 115a to 115d, and 116a to 116d included in the third to sixth sensing area blocks 190a, 170b, 180b, and 190b may be selected successively by the selection circuit 102.

A sensing signal may be detected, during a period selected by the selection circuit 102, from the corresponding sensing area and provided to the sensing signal detection unit 104.

In the case of a hover mode, for example, the selection circuit 102 may select, during the first period of the touch driving period T2, first and second sensing areas 111a and 111b included in the first sensing area block 170a, first and second sensing areas 112a and 112b included in the second sensing area block 180a, and first and second sensing areas 113a and 113b included in the third sensing area block 190a. Thereafter, the selection circuit 102 may select, during the second period of the touch driving period T2, third and fourth sensing areas 111c and 111d included in the first sensing area block 170a, third and fourth sensing areas 112c and 112d included in the second sensing area block 180a, and third and fourth sensing areas 113c and 113d included in the third sensing area block 190a. In this manner, multiple sensing areas 114a to 114d, 115a to 115d, and 116a to 116d included in the fourth to sixth sensing area blocks 170b, 180b, and 190b may be selected by the selection circuit 102.

As illustrated in FIG. 6, the sensing signal detection unit 104 may include first and second sensing signal detection units 104a and 104b. The selection circuit 102 may include first and second selection circuits 102a and 102b. Each of the first and second selection circuits 102a and 102b may be a multiplexer, for example, but the present invention is not limited thereto.

Although it has been assumed for convenience of description that two sensing signal detection units 104 and two selection circuits 102 are provided, more than two sensing signal detection units and more than two selection circuits may also be provided.

In order to reduce the number of output pins of the sensing signal detection unit 104, first and second selection circuits 102a and 102b may be installed between the sensing signal detection unit 104 and the display panel 10.

Each of the first and second selection circuits 102a and 102b is a 1:N (N is a positive integer equal to or larger than 2 and smaller than n, n is the number of sensing lines) multiplexer, and can reduce the number of pins of the sensing signal detection unit 104 by 1/N.

The output end of the first sensing signal detection unit 104a may be connected to the input end of the first selection circuit 102a. The output end of the second sensing signal detection unit 104b may be connected to the input end of the second selection circuit 102b.

For example, first to fourth output lines 131a, 131b, 131c, and 131d may be arranged between the first sensing signal detection unit 104a and the first selection circuit 102a, and first to fourth output lines 132a, 132b, 132c, and 132d may be arranged between the second sensing signal detection unit and the second selection circuit 102b. For example, first ends of the first to fourth output lines 131a, 131b, 131c, and 131d may be connected to the output end of the first sensing signal detection unit 104a, and second ends of the first to fourth output lines 131a, 131b, 131c, and 131d may be connected to the input end of the first selection circuit 102a. For example, first ends of the first to fourth output lines 132a, 132b, 132c, and 132d may be connected to the output end of the second sensing signal detection unit, and second ends of the first to fourth output lines 132a, 132b, 132c, and 132d may be connected to the input end of the second selection circuit 102b.

The output end of the first selection circuit 102a may be connected to sensing lines 121a to 121d, 122a to 122d, and 123a to 123d included in first to third sensing area blocks 170a, 180a, and 190a, and the output end of the second selection circuit 102b may be connected to sensing lines 124a to 124d, 125a to 125d, and 126a to 126d included in fourth to sixth sensing area blocks 170b, 180b, and 190b.

For example, in the case of a finger mode, first to fourth output lines 131a, 131b, 131c, and 131d connected to the input end of the first selection circuit 102a may be successively connected, one to one, to first to fourth sensing lines 121a to 121d included in the first sensing area block 170a connected to the output end of the first selection circuit 102a, to first to fourth sensing lines 122a to 122d included in the second sensing area block 180a, or to first to fourth sensing lines 123a to 123d included in the third sensing area block 190a. Similarly, in the case of a finger mode, first to fourth output lines 132a, 132b, 132c, and 132d connected to the input end of the second selection circuit 102b may be successively connected, one to one, to first to fourth sensing lines 124a to 124d included in the fourth sensing area block 170b connected to the output end of the second selection circuit 102b, to first to fourth sensing lines 125a to 125d included in the fifth sensing area block 180b, or to first to fourth sensing lines 126a to 126d included in the sixth sensing area block 190b.

For example, in the case of a hover mode, the first output line 131a connected to the input end of the first selection circuit 102a may be simultaneously connected to first sensing lines 121a, 122a, and 123a included in the first to third sensing area blocks 170a, 180a, and 190a, respectively, which are connected to the output end of the first selection circuit 102a, and the second output line 131b connected to the input end of the first selection circuit 102a may be simultaneously connected to second sensing lines 121b, 122b, and 123b included in the first to third sensing area blocks 170a, 180a, and 190a, respectively, which are connected to the output end of the first selection circuit 102a. For example, in the case of a hover mode, the first output line 132a connected to the input end of the second selection circuit 102b may be simultaneously connected to first sensing lines 124a, 125a, and 126a included in the fourth to sixth sensing area blocks 170b, 180b, and 190b, respectively, which are connected to the output end of the second selection circuit 102b, and the second output line 132b connected to the input end of the second selection circuit 102b may be simultaneously connected to second sensing lines 124b, 125b, and 126b included in the fourth to sixth sensing area blocks 170b, 180b, and 190b, respectively, which are connected to the output end of the second selection circuit 102b.

Figure 7:
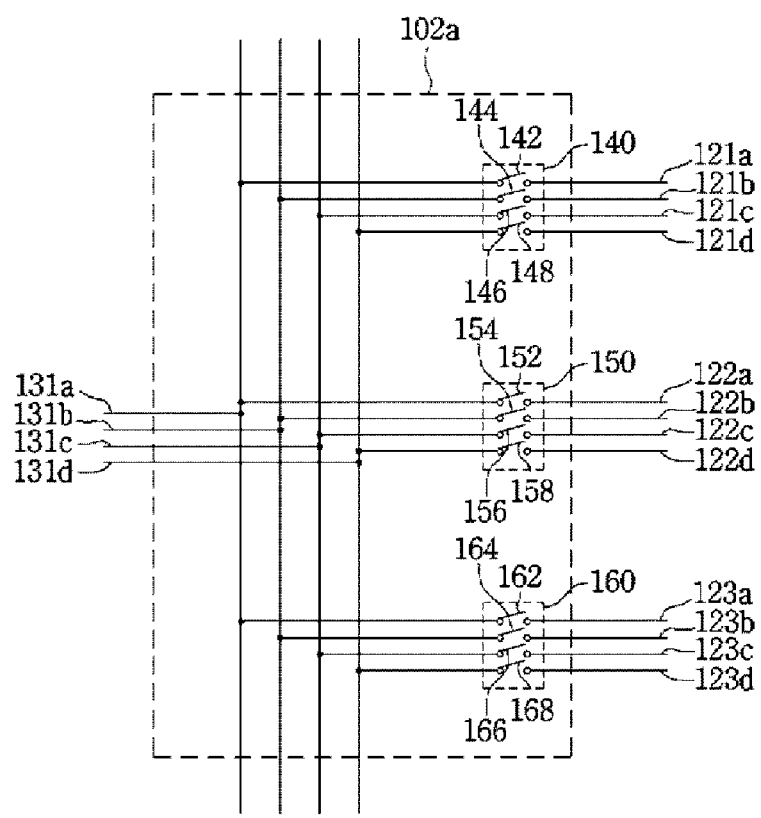
FIG. 7 is a circuit diagram illustrating a detailed structure of a first selection circuit of FIG. 6.

As illustrated in FIG. 7, the first selection circuit 102a may include first to third switch groups 140, 150, and 160.

For example, the output end of the first switch group 140 may be connected to the first to fourth sensing lines 121a to 121d of the first sensing area block 170a. For example, the output end of the second switch group 150 may be connected to the first to fourth sensing lines 122a to 122d of the second sensing area block 180a. For example, the output end of the third switch group 160 may be connected to the first to fourth sensing lines 123a to 123d of the third sensing area block 190a.

For example, the first switch group 140 may connect the first to fourth output lines 131a, 131b, 131c, and 131d, which are connected to the output end of the first sensing signal detection unit 104a, to the first to fourth sensing lines 121a to 121d of the first sensing area block 170a, respectively.

For example, the second switch group 150 may connect the first to fourth output lines 131a, 131b, 131c, and 131d, which are connected to the output end of the first sensing signal detection unit 104a, to the first to fourth sensing lines 122a to 122d of the second sensing area block 180a, respectively.

For example, the third switch group 160 may connect the first to fourth output lines 131a, 131b, 131c, and 131d, which are connected to the output end of the first sensing signal detection unit 104a, to the first to fourth sensing lines 123a to 123d of the third sensing area block 190a, respectively.

For example, the first switch group 140 may include first to fourth switches 142, 144, 146, and 148. The first to fourth switches 142, 144, 146, and 148 may be semiconductor transistors, but the present invention is not limited thereto. The first switch 142 may be connected between the first output line 131a and the first sensing line 121a of the first sensing area block 170a. The second switch 144 may be connected between the second output line 131b and the second sensing line 121b of the first sensing area block 170a. The third switch 146 may be connected between the third output line 131c and the third sensing line 121c of the first sensing area block 170a. The fourth switch 148 may be connected between the fourth output line 131d and the fourth sensing line 121d of the first sensing area block 170a.

Similarly, the second switch group 150 may include first to fourth switches 152, 154, 156, and 158, and the third switch group 160 may include first to fourth switches 162, 164, 166, and 168.

On the other hand, although not illustrated, the detailed structure of the second selection circuit 102b is substantially identical to the detailed structure of the first selection circuit 102a, and the detailed structure of the second selection circuit 102b therefore can be easily understood from that of the first selection circuit 102a, repeated description thereof being omitted herein for clarity.

Figure 10:
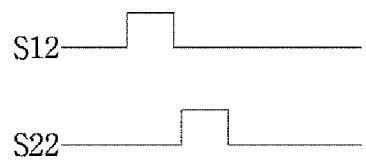
FIG. 10 is a waveform diagram for driving a touch sensing device in a hover mode according to the present invention.

The touch sensing device including the selection circuit 102 configured as above can be driven differently according to a finger mode and a hover mode. In the case of the finger mode, the selection circuit 102 may be driven by selection signals S11, S21, S31, and S41 illustrated in FIG. 8; and, in the case of the hover mode, the selection circuit 102 may be driven by selection signals S12 and S22 illustrated in FIG. 10. The selection signals illustrated in FIG. 8 and FIG. 10 are examples only, and various variants are possible.

Finger Mode Driving

A method for driving in the finger mode, in connection with a touch sensing device, will be described with reference to FIGS. 5 to 8, 9A, 9B, 9C, and 9D.

Figure 8:
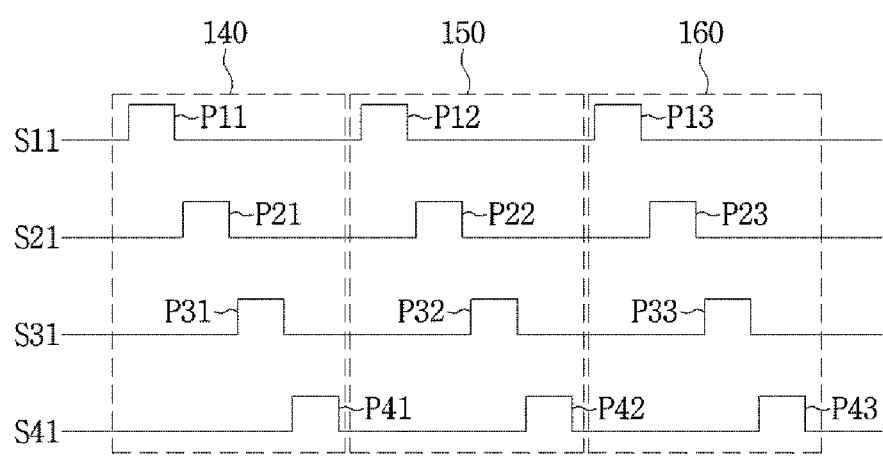
FIG. 8 is a waveform diagram for driving a touch sensing device in a finger mode according to the present invention.

FIG. 8 is a waveform diagram for driving in the finger mode in connection with a touch sensing device according to the present invention, and FIGS. 9A, 9B, 9C, and 9D are diagrams illustrating finger mode driving in connection with the touch sensing device according to the present invention.

As illustrated in FIG. 8, first to fourth selection signals S11, S21, S31, and S41 may be supplied to the first selection circuit 102a. Specifically, the first selection signal S11 may be supplied to the first switches 142, 152, and 162 of the first to third switch groups 140, 150, and 160, respectively, such that the first switches 142, 152, and 162 can be switching-controlled in response to the first selection signal S11. The second selection signal S21 may be supplied to the second switches 144, 154, and 164 of the first to third switch groups 140, 150, and 160, respectively, such that the second switches 144, 154, and 164 can be switching-controlled in response to the second selection signal S21. The third selection signal S31 may be supplied to the third switches 146, 156, and 166 of the first to third switch groups 140, 150, and 160, respectively, such that the third switches 146, 156, and 166 can be switching-controlled in response to the third selection signal S31. The fourth selection signal S41 may be supplied to the fourth switches 148, 158, and 168 of the first to third switch groups 140, 150, and 160, respectively, such that the fourth switches 148, 158, and 168 can be switching-controlled in response to the fourth selection signal S41.

More specifically, the first selection signal S11 may include first to third pulses P11, P12, and P13, which have high levels. The first pulse P11 may be supplied to the first switch 142 of the first switch group 140, the second pulse P12 may be supplied to the first switch 152 of the second switch group 150, and the third pulse P13 may be supplied to the first switch 162 of the third switch group 160.

The second selection signal S21 may include first to third pulses P21, P22, and P23, which have high levels. The first pulse P21 may be supplied to the second switch 144 of the first switch group 140, the second pulse P22 may be supplied to the second switch 154 of the second switch group 150, and the third pulse P23 may be supplied to the second switch 164 of the third switch group 160.

The third selection signal S31 may include first to third pulses P31, P32, and P33, which have high levels. The first pulse P31 may be supplied to the third switch 146 of the first switch group 140, the second pulse P32 may be supplied to the third switch 156 of the second switch group 150, and the third pulse P33 may be supplied to the third switch 166 of the third switch group 160.

The fourth selection signal S41 may include first to third pulses P41, P42, and P43, which have high levels. The first pulse P41 may be supplied to the fourth switch 148 of the first switch group 140, the second pulse P42 may be supplied to the fourth switch 158 of the second switch group 150, and the third pulse P43 may be supplied to the fourth switch 168 of the fourth switch group.

As illustrated in FIG. 8, the first pulse P11 of the first selection signal S11, the first pulse P21 of the second selection signal S21, the first pulse P31 of the third selection signal S31, and the first pulse P41 of the fourth selection signal P41 may be generated successively, and the first to fourth switches 142, 144, 146, and 148 of the first switch group 140 may be turned on successively by the first pulse P11 of the first selection signal S11, the first pulse P21 of the second selection signal S21, the first pulse P31 of the third selection signal S31, and the first pulse P41 of the fourth selection signal P41, which have been generated successively.

The second pulse P12 of the first selection signal S11, the second pulse P22 of the second selection signal S21, the second pulse P32 of the third selection signal S31, and the second pulse P42 of the fourth selection signal P41 may be generated successively, and the first to fourth switches 152, 154, 156, and 158 of the second switch group 150 may be turned on by the second pulse P12 of the first selection signal S11, the second pulse P22 of the second selection signal S21, the second pulse P32 of the third selection signal S31, and the second pulse P42 of the fourth selection signal P41, which have been generated successively.

The third pulse P13 of the first selection signal S11, the third pulse P23 of the second selection signal S21, the third pulse P33 of the third selection signal S31, and the third pulse P43 of the fourth selection signal P41 may be generated successively, and the first to fourth switches 162, 164, 166, and 168 of the third switch group 160 may be turned on by the third pulse P13 of the first selection signal S11, the third pulse P23 of the second selection signal S21, the third pulse P33 of the third selection signal S31, and the third pulse P43 of the fourth selection signal P41, which have been generated successively.

Figure 9A:
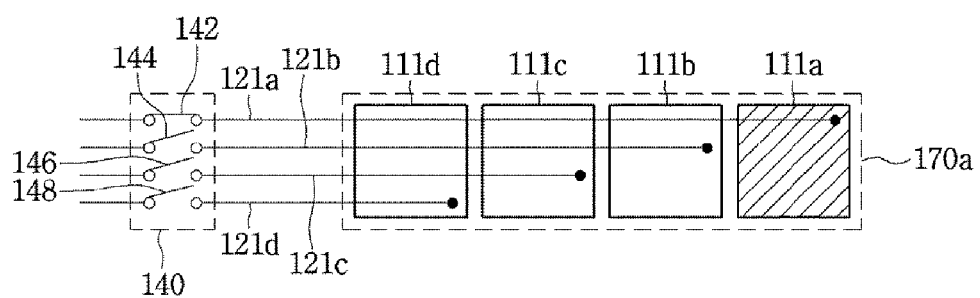
FIGS. 9A, 9B, 9C and FIG. 9D are diagrams illustrating finger-mode driving of a touch sensing device according to the present invention.

As illustrated in FIG. 9A, the first switch 142 of the first switch group 140 may be turned on in response to the first pulse P11 of the first selection signal S11, and the first driving signal S1 illustrated in FIG. 12 may be supplied to the first sensing area 111a of the first sensing area block 170a via the first switch 142 of the first switch group 140 and the first sensing line 121a. As a result, the first sensing area 111a of the first sensing area block 170a is activated, and a sensing signal, which reflects a change in capacitance as a result of the user's touch input with regard to the first sensing area 111a, may be supplied to the first sensing signal detection unit 104a via the first sensing line 121a and the first switch 142. In this case, the second to fourth switches 144, 146, and 148 are turned off.

Figure 9B:
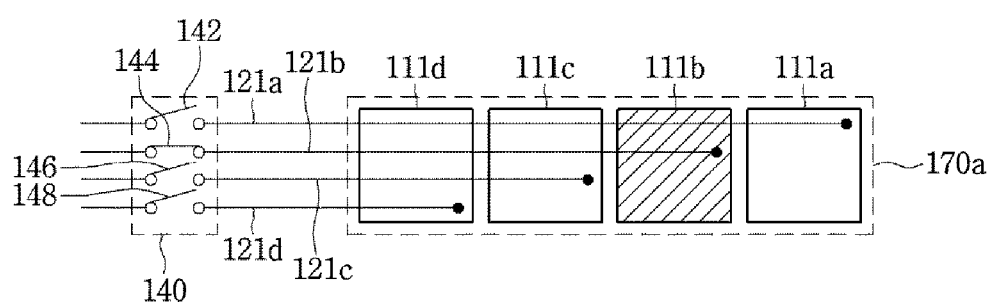

As illustrated in FIG. 9B, the second switch 144 of the first switch group 140 may be turned on in response to the first pulse P21 of the second selection signal S21, and the second driving signal S21 illustrated in FIG. 12 may be supplied to the second sensing area 111b of the first sensing area block 170a via the second switch 144 of the first switch group 140 and the second sensing line 121b. As a result, the second sensing area 111b of the first sensing area block 170a is activated, and a sensing signal, which reflects a change in capacitance as a result of the user's touch input with regard to the second sensing area 111b, may be supplied to the first sensing signal detection unit 104a via the second sensing line 121b and the second switch 144. In this case, the first, third, and fourth switches 142, 146, and 148 are turned off.

Figure 9C:
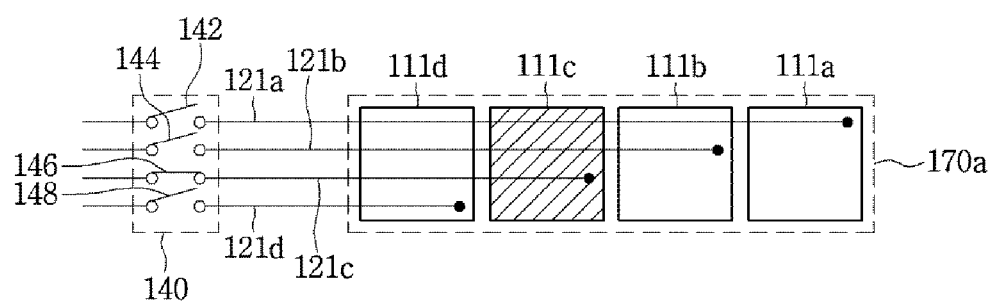

As illustrated in FIG. 9C, the third switch 146 of the first switch group 140 may be turned on in response to the first pulse P31 of the third selection signal S31, and the third driving signal S3 illustrated in FIG. 12 may be supplied to the third sensing area 111c of the first sensing area block 170a via the third switch 146 of the first switch group 140 and the third sensing line 121c. As a result, the third sensing area 111c of the first sensing area block 170a is activated, and a sensing signal, which reflects a change in capacitance as a result of the user's touch input with regard to the third sensing area 111c, may be supplied to the first sensing signal detection unit 104a via the third sensing line 121c and the third switch 146. In this case, the first, second, and fourth switches 142, 144, and 148 are turned off.

Figure 9D:
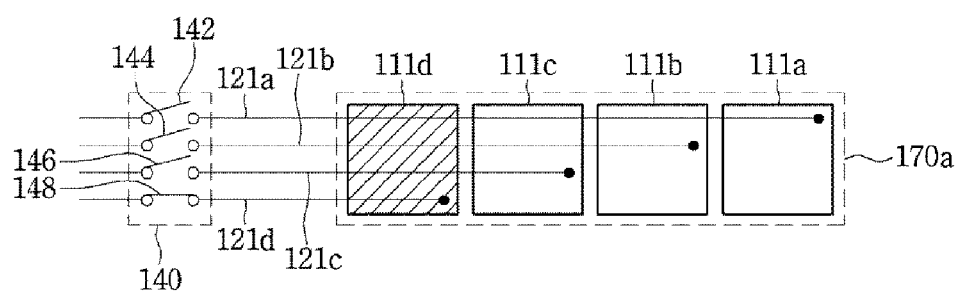

As illustrated in FIG. 9D, the fourth switch 148 of the first switch group 140 may be turned on in response to the first pulse P41 of the fourth selection signal S41, and the fourth driving signal S4 illustrated in FIG. 12 may be supplied to the fourth sensing area 111d of the first sensing area block 170a via the fourth switch 148 of the first switch group 140 and the fourth sensing line 121d. As a result, the fourth sensing area 111d of the first sensing area block 170a is activated, and a sensing signal, which reflects a change in capacitance as a result of the user's touch input with regard to the fourth sensing area 111d, may be supplied to the first sensing signal detection unit 104a via the fourth sensing line 121d and the fourth switch 148. In this case, the first to third switches 142, 144, and 146 are turned off.

Although not illustrated, the second pulse P12 of the first selection signal S11, the second pulse P22 of the second selection signal S21, the second pulse P32 of the third selection signal S31, and the second pulse P42 of the fourth selection signal S41 are successively supplied such that the first to fourth switches 152, 154, 156, and 158 of the second switch group 150 are turned on successively; as a result, a sensing signal, which reflects whether the user touches the first to fourth sensing areas 112a to 112d of the second sensing area block 180a or not, may be supplied to the first sensing signal detection unit 104a.

Although not illustrated, the third pulse P13 of the first selection signal S11, the third pulse P23 of the second selection signal S21, the third pulse P33 of the third selection signal S31, and the third pulse P43 of the fourth selection signal S41 are successively supplied such that the first to fourth switches 162, 164, 166, and 168 of the third switch group 160 are turned on successively; as a result, a sensing signal, which reflects whether the user touches the first to fourth sensing areas 113a to 113d of the third sensing area block 190a or not, may be supplied to the first sensing signal detection unit 104a.

Although not illustrated, the selection signals S11, S21, S31, and S41 illustrated in FIG. 8 may be supplied to the second selection circuit 102b as well. As a result, the second selection circuit 102b may also be selectively driven by the selection signals S11, S21, S31, and S41 illustrated in FIG. 8 in the same manner as the selective driving of the first selection circuit 102a describe above.

As described above, multiple sensing areas 111a to 111d, 112a to 112d, and 113a to 113d in respective sensing area blocks 170a, 180a, and 190a may be activated successively in the finger mode. In the finger mode, a direct contact occurs between the user and the sensing areas 111a to 111d, 112a to 112d, and 113a to 113d, and the distance between the sensing areas 111a to 111d, 112a to 112d, and 113a to 113d and the user's finger becomes zero. As result, the capacitance of respective sensing areas 111a to 111d, 112a to 112d, and 113a to 113d is sufficiently large, and it is possible to sufficiently detect whether the user's touch occurs or not through respective sensing areas 111a to 111d, 112a to 112d, and 113a to 113d.

Hover Mode Driving

A method for driving in the hover mode, in connection with a touch sensing device, will be described with reference to FIG. 5 to FIG. 7 and FIG. 10, FIG. 11A, and FIG. 11B.

Figure 11A:
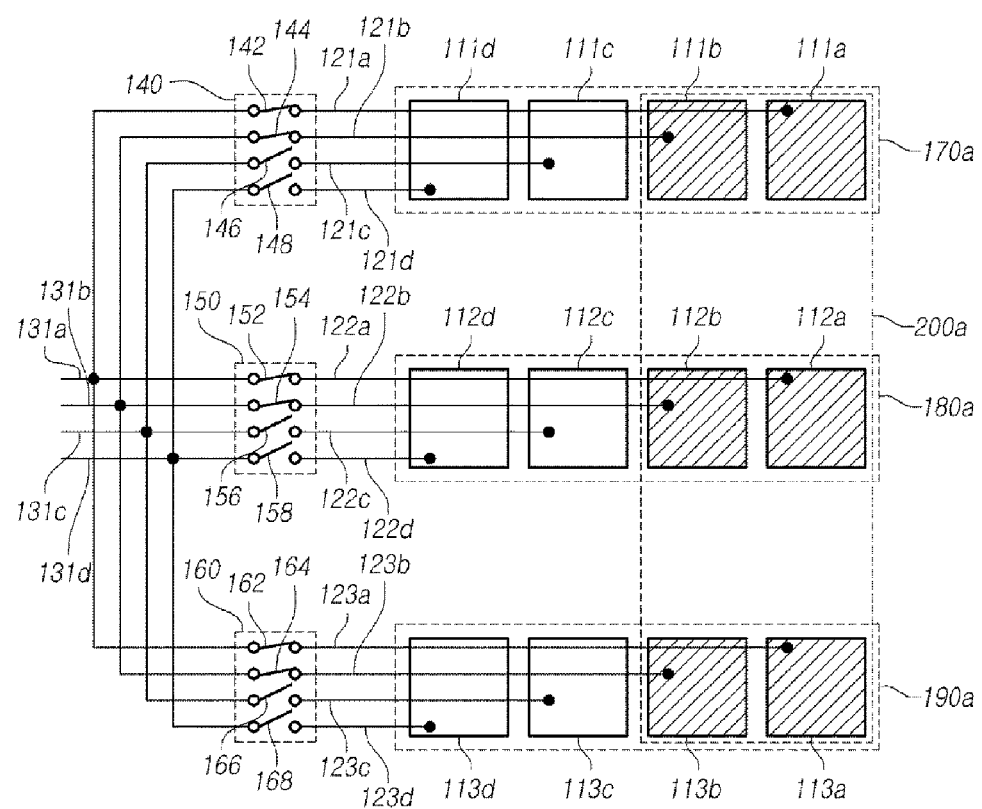
FIG. 11A and FIG. 11B are diagrams illustrating hover-mode driving of a touch sensing device according to the present invention.
Figure 11B:
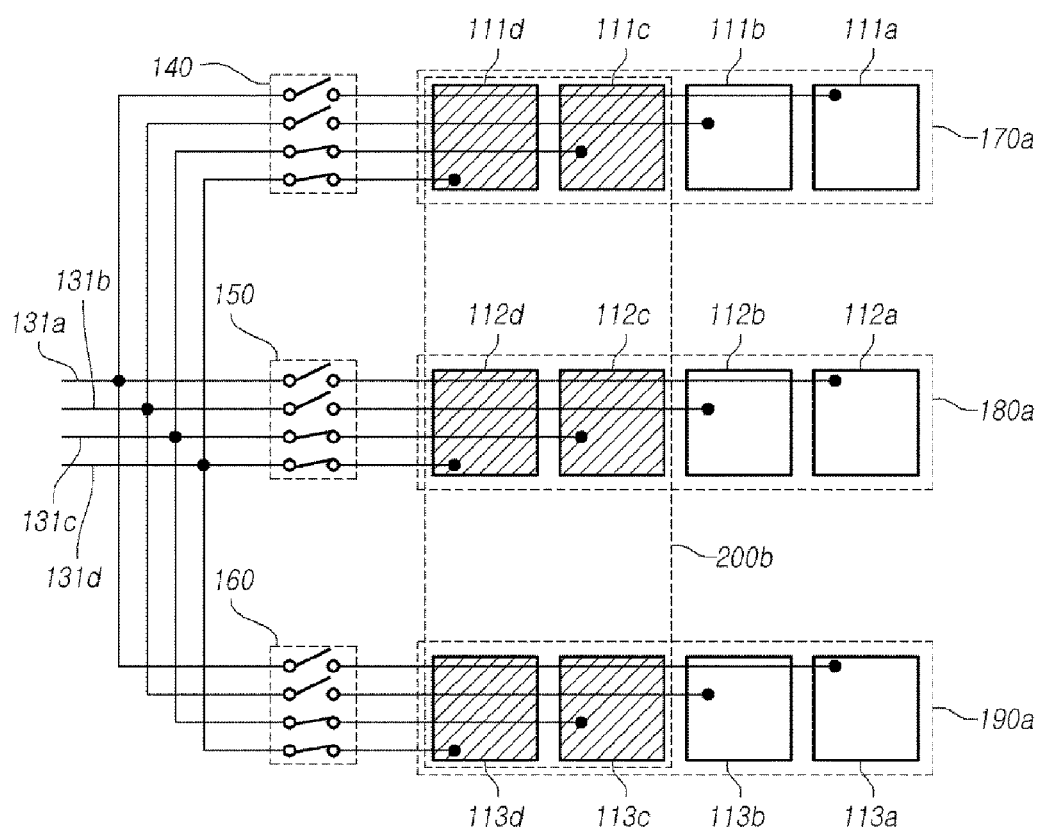

FIG. 10 is a waveform diagram for driving in the hover mode in connection with a touch sensing device according to the present invention, and FIG. 11A and FIG. 11B are diagrams illustrating hover mode driving in connection with the touch sensing device according to the present invention.

As illustrated in FIG. 10, two selection signals S12 and S22 may be generated successively, and first to fourth switches 142-148, 152-158, and 162-168 of first to third switch groups 140, 150, and 160 included in the first selection circuit 102a may be switching-controlled by the two selection signals S12 and S22.

For example, the first selection signal S12 may be simultaneously supplied to the first and second switches 142 and 144 of the first switch group 140, to the first and second switches 152 and 154 of the second switch group 150, and to the first and second switches 162 and 164 of the third switch group 160 such that the first and second switches 142 and 144 of the first switch group 140, the first and second switches 152 and 154 of the second switch group 150, and the first and second switches 162 and 164 of the third switch group 160 can be switching-controlled simultaneously. The second selection signal S22 may be simultaneously supplied to the third and fourth switches 146 and 148 of the first switch group 140, to the third and fourth switches 156 and 158 of the second switch group 150, and to the third and fourth switches 166 and 168 of the third switch group 160 such that the third and fourth switches 146 and 148 of the first switch group 140, the third and fourth switches 156 and 158 of the second switch group 150, and the third and fourth switches 166 and 168 of the third switch group 160 can be switching-controlled simultaneously.

As illustrated in FIG. 11A, the first selection signal S12 may be simultaneously supplied to the first to third switch groups 140, 150, and 160 of the first selection circuit 102a. In response to the first selection switch S12, the first and second switches 142 and 144 of the first switch group 140, the first and second switches 152 and 154 of the second switch group 150, and the first and second switches 162 and 164 of the third switch group 160 may be turned on simultaneously. As a result, the first and second driving signals S1 and S2 illustrated in FIG. 12 may be supplied to the first and second sensing areas 111a, 111b, 112a, 112b, 113a, and 113b of the first to third sensing area blocks 170a, 180a, and 190a, respectively, via the first and second switches 142 and 144 of the first switch group 140, the first and second switches 152 and 154 of the second switch group 150, and the first and second switches 162 and 164 of the third switch group 160. In this case, a first hover activation block 200a may be defined as a result of simultaneous activation of the first and second sensing areas 111a, 111b, 112a, 112b, 113a, and 113b of the first to third sensing area blocks 170a, 180a, and 190a, respectively, via the first and second switches 142 and 144 of the first switch group 140, the first and second switches 152 and 154 of the second switch group 150, and the first and second switches 162 and 164 of the third switch group 160. The first hover activation block 200a has six activated sensing areas; as a result, the total sum of capacitances connected to respective sensing areas accumulates and becomes six times the capacitance of a single sensing area, and the sensing sensitivity also increases six times; this makes it possible to easily detect whether the user's touch occurs or not even in the hover mode, in which the user makes no direct contact with the display panel 10.

A sensing signal, which reflects whether the user's indirect touch occurs or not in the hover mode on the basis of improved touch sensitivity of the first hover activation block 200*a*, may be supplied to the first sensing signal detection unit 104*a*.

As illustrated in FIG. 11B, the second selection signal S22 may be simultaneously supplied to the first to third switch groups 140, 150, and 160 of the first selection circuit 102*a*. In response to the second selection switch S22, the third and fourth switches 146 and 148 of the first switch group 140, the third and fourth switches 156 and 158 of the second switch group 150, and the third and fourth switches 166 and 168 of the third switch group 160 may be turned on simultaneously. As a result, the third and fourth driving signals S3 and S4 illustrated in FIG. 12 may be supplied to the third and fourth sensing areas 111*c*, 111*d*, 112*c*, 112*d*, 113*c*, and 113*d* of the first to third sensing area blocks 170*a*, 180*a*, and 190*a*, respectively, via the third and fourth switches 146 and 148 of the first switch group 140, the third and fourth switches 156 and 158 of the second switch group 150, and the third and fourth switches 166 and 168 of the third switch group 160. In this case, a second hover activation block 200*b* may be defined as a result of simultaneous activation of the third and fourth sensing areas 111*c*, 111*d*, 112*c*, 112*d*, 113*c*, and 113*d* of the first to third sensing area blocks 170*a*, 180*a*, and 190*a*, respectively, via the third and fourth switches 146 and 148 of the first switch group 140, the third and fourth switches 156 and 158 of the second switch group 150, and the third and fourth switches 166 and 168 of the third switch group 160. The second hover activation block 200*b* has six activated sensing areas; as a result, the total sum of capacitances connected to respective sensing areas accumulates and becomes six times the capacitance of a single sensing area, and the sensing sensitivity also increases six times; this makes it possible to easily detect whether the user's touch occurs or not even in the hover mode, in which the user makes no direct contact with the display panel 10.

Respective hover activation blocks 200*a* and 200*b* may be at least two sensing areas activated simultaneously.

Although not illustrated, respective hover activation blocks 200*a* and 200*b* may be defined as a first sensing area block 170*a*. For example, first to fourth sensing areas 111*a* to 111*d* within the first sensing area block 170*a* may be defined as a first hover activation block and activated simultaneously. Thereafter, first to fourth sensing areas 112*a* to 112*d* within the second sensing area block 180*a* may be defined as a second hover activation block and activated simultaneously. Thereafter, first to fourth sensing areas 113*a* to 113*d* within the third sensing area block 190*a* may be defined as a third hover activation block and activated simultaneously.

Although not illustrated, the same hover mode driving scheme by means of driving of the first selection circuit 102*a* illustrated in FIG. 11A and FIG. 11B may be applied to the hover driving scheme by means of driving of the second selection circuit 102*b*.

Although not illustrated, four selection signals may be generated successively, unlike FIG. 10, and first switches 142, 152, and 162 of first to third switch groups 140, 150, and 160, respectively, may be turned on simultaneously by the first selection signal such that driving signals simultaneously activate the first sensing areas 111*a*, 112*a*, and 113*a* via the first switches 142, 152, and 162 of the first to third switch groups 140, 150, and 160, respectively, and corresponding sensing lines 121*a*, 122*a*, and 123*a*. Second switches 144, 154, and 164 of the first to third switch groups 140, 150, and 160, respectively, may be turned on simultaneously by the second selection signal such that driving signals simultaneously active the second sensing areas 111*b*, 112*b*, and 113*b* via the second switches 144, 154, and 164 of the first to third switch groups 140, 150, and 160, respectively, and corresponding sensing lines 121*b*, 122*b*, and 123*b*. Third switches 146, 156, and 166 of the first to third switch groups 140, 150, and 160, respectively, may be turned on simultaneously by the third selection signal such that driving signals simultaneously active the third sensing areas 111*c*, 112*c*, and 113*c* via the third switches 146, 156, and 166 of the first to third switch groups 140, 150, and 160, respectively, and corresponding sensing lines 121*c*, 122*c*, and 123*c*. Fourth switches 148, 158, and 168 of the first to third switch groups 140, 150, and 160, respectively, may be turned on simultaneously by the fourth selection signal such that driving signals simultaneously active the fourth sensing areas 111*d*, 112*d*, and 113*d* via the fourth switches 148, 158, and 168 of the first to third switch groups 140, 150, and 160, respectively, and corresponding sensing lines 121*d*, 122*d*, and 123*d*.

In the above-mentioned hover mode, it is detected whether a touch occurs or not while the user's finger maintains a predetermined distance from the sensing areas 111*a* to 1113, 112*a* to 112*d*, and 131*a* to 113*d* without contacting them. In this case, the capacitance of respective sensing areas 111*a* to 111*d*, 112*a* to 112*d*, and 113*a* to 113*d* decreases remarkably as the distance between the sensing areas 111*a* to 111*d*, 112*a* to 112*d*, and 113*a* to 113*d* and the user's finger increases, compared with the finger mode. According to the present invention, multiple sensing areas are activated to make it possible to sufficiently sense whether a touch has occurred or not even in the hover mode, and the increased capacitance of the total sensing areas improves the sensing capability.

In addition, according to the present invention, both a finger mode and a sensing mode can be driven such that touch detection is possible not only by a direct touch by the user, but also by an indirect touch, i.e. non-contact touch, thereby expanding the range of use of the touch sensing device.

Hereinafter, the above-described touch driving scheme will be described again briefly, examples of driving signals for the contact touch driving and the non-contact touch driving will be described, and a load-free driving scheme for improving the touch sensing accuracy by removing any unnecessary parasitic capacitance will be described.

A display device according to the present invention provides a touch mode, and the touch mode can be largely divided into a contact touch mode and a non-conact touch mode.

The contact touch mode refers to a mode in which a touch made by directly contacting a display panel is recognized, and is also referred to as a finger mode.

The non-contact touch mode refers to a mode in which a touch on the display panel, without directly contacting the same, is recognized, and may include a proximity touch mode, in which a proximity touch, without contacting the display panel, is recognized, and a hovering mode, in which a touch made by hovering over the display panel is recognized.

A touch sensing device according to the present invention includes a display panel 10, which includes multiple touch sensors TS, a touch sensing circuit 100, which drives the multiple touch sensors TS and senses a touch, etc.

The touch sensing circuit 100 may include a sensing signal detection unit 104, which supplies the multiple touch sensors TS with driving signals for touch recognition, and which detects a sensing signal through the multiple touch sensors TS, a selection circuit 102 configured to electrically connect different numbers of touch sensors TS to the sensing signal detection unit 104 in the case of contact touch driving and in the case of non-contact touch driving, etc.

The selection circuit 102, in the case of contact touch deriving, may electrically connect the multiple touch sensors TS to the sensing signal detection unit 104 successively.

The selection circuit 102, in the case of non-contact touch deriving, may electrically connect two or more of the multiple touch sensors TS to the sensing signal detection unit 104 simultaneously.

The sensing signal detection unit 104 may include one or more detection units.

The selection circuit 102 may include one or more multiplexers which correspond to and are connected to one or more detection units.

Each of the one or more multiplexers may include multiple switch groups.

Each of the multiple switch groups may include multiple switches electrically connected to multiple touch sensors TS.

The multiple switches may connect multiple output lines, which are connected to the sensing signal detection unit 104, with multiple sensing lines connected to multiple touch sensors TS.

Each of the multiple switches may, in response to a selection signal, selectively connect a corresponding output line and a corresponding sensing line.

The sensing signal detection unit 104 may, as all switches included in one or at least two multiplexers are successively turned on one after another in the case of a contact touch (touch recognized as a finger mode), supply a driving signal to a touch sensor TS that is connected at a specific timing.

The sensing signal detection unit 104 may, as every two or more of all switches included in one or at least two multiplexers are turned on together in the case of a non-contact touch (for example, touch recognized as a hover mode), supply a driving signal to all of two or more touch sensors TS that are connected together at a specific timing.

The selection circuit 102 may, in the case of contact touch driving, connect one touch sensor TS to the sensing signal detection unit 104 at a point of time and, in the case of non-contact touch driving, connect two or more touch sensors TS together to the sensing signal detection unit 104 at a point of time.

The selection circuit 102 may, in the case of non-contact touch driving, adaptively vary the number of touch sensors TS, which are connected together to the sensing signal detection unit 104, according to occurrence of an event. In this regard, the event may occur according to a user setup input or may occur by means of a control signal that automatically increases or decreases the number of touch sensors in order to improve the sensing accuracy and touch driving efficiency as a result of non-contact touch driving.

The touch sensing circuit 100 according to the present invention may include a sensing signal detection unit 104, which successively outputs driving signals to be applied to multiple touch sensors TS, and which detects a sensing signal through the multiple touch sensors TS, a selection circuit 102 configured to electrically connect different numbers of touch sensors TS to the sensing signal detection unit 104 in the case of contact touch driving and in the case of non-contact touch driving, etc.

The sensing signal detection unit 104 may, in the case of contact touch driving, output a driving signal, which is to be applied to one touch sensor TS, at a specific timing.

The sensing signal detection unit 104 may, in the case of non-contact touch driving, output a driving signal, which is to be applied to two or more touch sensors TS, at a specific timing.

The selection circuit 102, in the case of contact touch deriving, may electrically connect multiple touch sensors TS to the sensing signal detection unit 104 successively, one after another.

The selection circuit 102, in the case of non-contact touch deriving, may electrically connect every two or more of the multiple touch sensors TS to the sensing signal detection unit 104 successively.

The selection circuit 102 may be implemented as at least one multiplexer for electrically connecting different numbers of touch sensors TS to the sensing signal detection unit 104 in the case of contact touch driving and in the case of non-contact touch driving.

The selection circuit 102 may include multiple switches which switch the connection between the multiple touch sensors TS and the sensing signal detection unit 104 in response to a selection signal.

In the case of contact touch driving, the multiple switches are successively turned on one after another, and the sensing signal detection unit 104 may output a driving signal to a touch sensor TS, which is electrically connected through a switch that has been turned on, at a specific timing.

In the case of non-contact touch driving, every two or more of the multiple switches are successively turned on one after another, and the sensing signal detection unit 104 may output a driving signal to two or more touch sensors TS, which are electrically connected through two or more switches that have been turned on, at a specific timing.

The touch sensing circuit 100 according to the present invention is electrically connected to the multiple touch sensors TS arranged on the display panel 10, and successively supplies a driving signal to the multiple touch sensors TS in a touch driving mode; in the case of contact touch driving, the touch sensing circuit 100 may supply a driving signal to one touch sensor TS at a specific timing and, in the case of non-contact touch driving, may supply a driving signal to two or more touch sensors TS at a specific timing.

The touch sensing circuit 100 according to the present invention is electrically connected to the multiple touch sensors TS arranged on the display panel 10 through multiple sensing lines and supplies a driving signal to the multiple touch sensors TS successively in a touch driving mode; specifically, the touch sensing circuit 100 may supply a driving signal to two or more touch sensors together at a specific timing.

The two or more touch sensors TS may be touch sensors arranged on the display panel 10 in adjacent positions.

The two or more touch sensors TS may be adjacent to each other in the sensing line direction or may be adjacent in a direction different from the sensing line direction.

For example, the two or more touch sensors TS may be touch sensors arranged in adjacent positions in a direction parallel with the sensing line; may be touch sensors arranged in adjacent positions in a direction perpendicular to the sensing line; or may include at least one touch sensor, which is arranged in an adjacent position in the direction parallel with the sensing line, and at least one touch sensor, which is arranged in an adjacent position in the direction perpendicular to the sensing line direction.

In this regard, the sensing line that connects a touch sensor TS and the touch sensing circuit 100 may be, for example, parallel with the data line or parallel with the gate line.

The touch sensing circuit 100 according to the present invention is electrically connected to multiple touch sensors TS arranged on the display panel 10 and, during touch driving, supplies a driving signal to the multiple touch sensors TS successively and detects whether a touch has occurred or not; specifically, in the case of contact touch driving, the touch sensing circuit 100 may detect whether a touch has occurred or not with regard to each sensing area, which corresponds to one touch sensor TS, and, in the case of non-contact touch driving, may detect whether a touch has occurred or not with regard to each block, which corresponds to two or more touch sensors TS.

The touch sensing circuit 100 according to the present invention, described above, may be implemented as a touch integrated circuit.

In some cases, the touch sensing circuit 100 according to the present invention may be an internal circuit of a data driving circuit 24 implemented as a data driving integrated circuit chip.

On the other hand, in the case of contact touch driving, a driving signal is applied to one touch sensor TS at a specific point of time, but, in the case of non-contact touch driving, a driving signal is applied to two or more touch sensors TS; therefore, a larger load may occur during the non-contact touch driving, compared with the contact touch driving, and a driving signal of a non-sharp type may be applied to the touch sensors.

Therefore, use of the same driving signal during contact touch driving and during non-contact touch driving may degrade the touch sensing accuracy during the non-contact touch driving.

Therefore, the present invention may provide a method for using different driving signals, instead of using the same driving signal, during non-contact touch driving compared to the driving signals used during contact touch driving.

For example, in the case of non-contact touch driving, a driving signal Vh output from the touch sensing circuit 100 and supplied to multiple touch sensors TS may have an overdriving period OP.

The degree of overdriving Vover of the driving signal Vh in the overdriving period OP may vary depending on the position of the touch sensor TS to which the driving signal Vh is supplied.

For example, the degree of overdriving Vover of a driving signal Vh may increase in proportion to the distance between the device (a touch sensing circuit 100 or a data driving circuit 24 including the same) that supplies the driving signal Vh and the touch sensor TS to which the driving signal Vh is supplied. This is because the farther a touch sensor TS is from the device (a touch sensing circuit 100 or a data driving circuit 24 including the same) that supplies a driving signal Vh, the larger the load (corresponds to the RC value) becomes, and a driving signal Vh of a higher degree of overdriving needs to be supplied.

A driving signal Vh output from the touch sensing circuit 100 and supplied to multiple touch sensors TS in the case of non-contact touch driving may have a larger signal intensity than that of a driving signal Vf output from the touch sensing circuit 100 and supplied to multiple touch sensors TS in the case of contact touch driving (finger mode driving).

Figure 13:
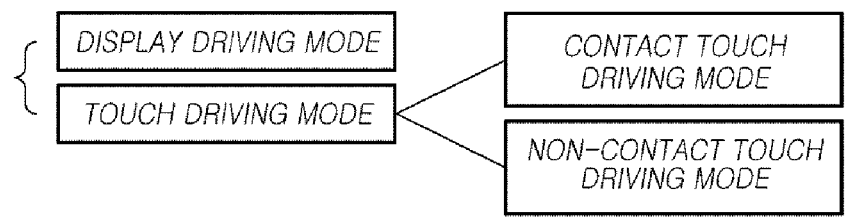
FIG. 13 is a diagram illustrating a display device driving mode according to the present invention.
Figure 14:
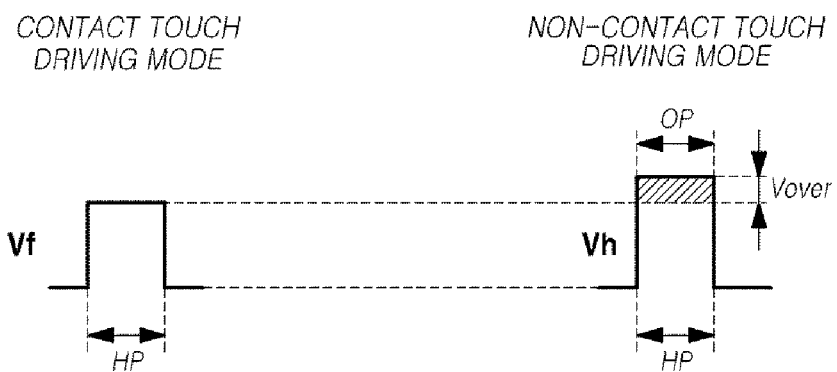
FIG. 14 and FIG. 15 are diagrams illustrating driving signals used in a display device touch driving mode according to the present invention, respectively.
Figure 15:
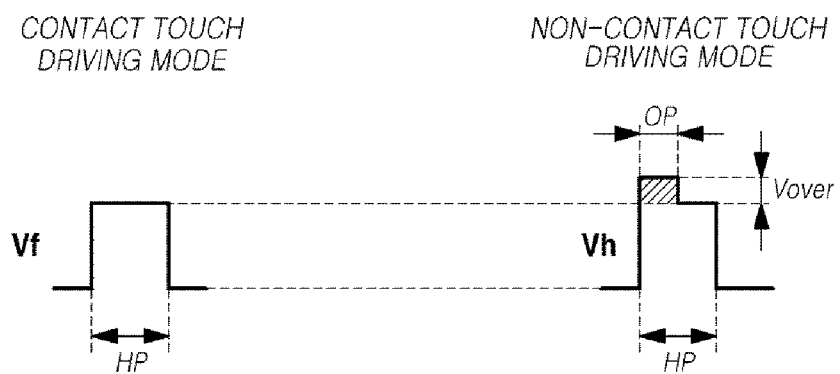

FIG. 13 is a diagram illustrating a display device driving mode according to the present invention, and FIG. 14 and FIG. 15 are diagrams illustrating one pulse of a driving signal used in the display device driving mode according to the present invention.

Referring to FIG. 13, a display device according to the present invention may operate in a display driving mode or in a touch driving mode.

Referring to FIG. 13, the touch driving mode may be divided into a contact touch driving mode and a non-contact touch driving mode. As used herein, the non-contact touch driving mode refers to a touch driving mode having such a concept that it includes all of a hover mode, a proximity touch driving mode, etc.

Referring to FIG. 14 and FIG. 15, a driving signal Vh supplied to two or more touch sensors TS at one timing in the non-contact touch driving mode uses a driving signal Vf, which is supplied to multiple touch sensors TS in a contact touch driving mode, as a reference waveform and may be, compared with the reference waveform Vf, a signal Vh that is overdriven as much as the overdriving voltage Vover during a predetermined overdriving period OP.

For example, as illustrated in FIG. 14, the overdriving period OP in connection with one pulse of a driving signal Vh in the non-contact touch driving mode may correspond to the entire width HP of one pulse.

As another example, as illustrated in FIG. 15, the overdriving period OP in connection with one pulse of a driving signal Vh in the non-contact touch driving mode may correspond to a part of the entire width HP of one pulse.

FIG. 16A to FIG. 16D illustrate four more specific examples of driving signals Vf and Vh in each of a contact touch driving mode (finger mode) and a non-contact touch driving mode according to the present invention.

Figure 16A:
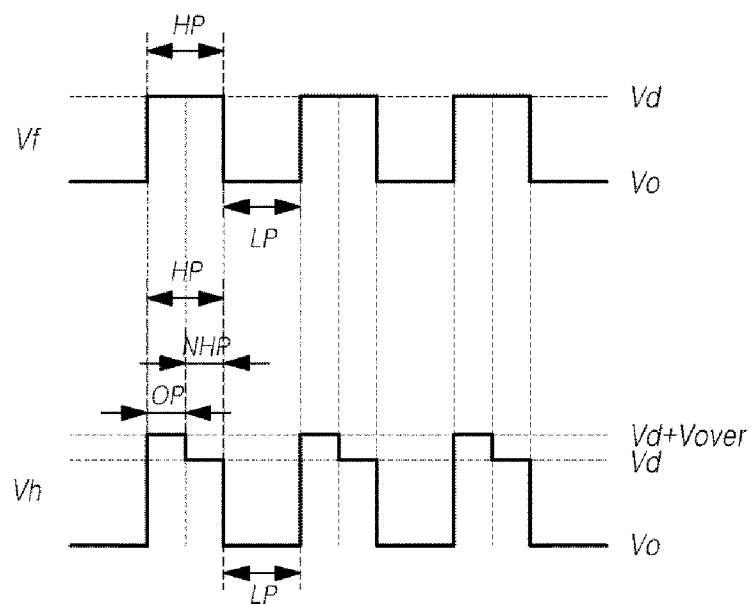
FIGS. 16A, 16B, 16C and FIG. 16D are exemplary diagrams of driving signals in each of a contact touch driving mode and a non-contact touch driving mode according to the present invention.

As in the case of an example illustrated in FIG. 16A, a driving signal generated and output from the touch sensing circuit 100 and may vary depending on the touch driving mode (contact touch driving mode, non-contact touch driving mode).

Referring to FIG. 16A, the driving signal Vf supplied to multiple touch sensors TS in the case of contact touch driving is a modulation pulse having a repeated low level period LP, which has a reference voltage Vo, and a repeated high level period HP, which has a driving voltage Vd higher than the reference voltage Vo.

Referring to FIG. 16A, the driving signal Vh supplied to multiple touch sensors TS in the case of non-contact touch driving is a modulation pulse having a repeated low level period LP, which has a reference voltage Vo, and a repeated high level period HP, which has a voltage Vd+Vover, Vd higher than the reference voltage Vo.

Referring to FIG. 16A, in connection with the driving signal Vh supplied to multiple touch sensors TS in the case of non-contact touch driving, the high level period HP may include an overdriving period OP and a normal high level period NHP.

In connection with the driving signal Vh supplied to multiple touch sensors TS in the case of non-contact touch driving, the overdriving period OP within the high level period HP has an overdriving driving period Vd+Vover, which is higher than the driving voltage Vd by the overdriving voltage Vover.

In connection with the driving signal Vh supplied to multiple touch sensors TS in the case of non-contact touch driving, the normal high level period NHP within the high level period HP has a driving voltage Vd higher than the reference voltage Vo.

Figure 16B:
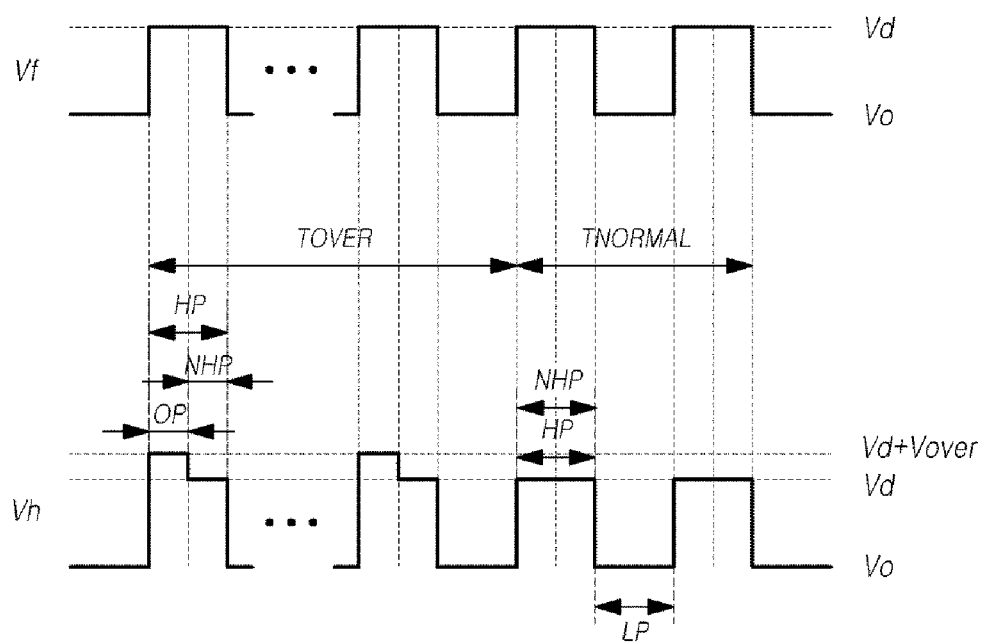

As in the case of another example illustrated in FIG. 16B, a driving signal generated and output from the touch sensing circuit 100 may vary depending on the touch driving mode (contact touch driving mode, non-contact touch driving mode).

Referring to FIG. 16B, the driving signal Vf supplied to multiple touch sensors TS in the case of contact touch driving is a modulation pulse having a repeated low level period LP, which has a reference voltage Vo, and a repeated high level period HP, which has a driving voltage Vd higher than the reference voltage Vo.

Referring to FIG. 16B, the driving signal Vh supplied to multiple touch sensors TS in the case of non-contact touch driving is a modulation pulse having a repeated low level period LP, which has a reference voltage Vo, and a repeated high level period HP, which has a voltage Vd+Vover, Vd higher than the reference voltage Vo.

During a first driving period Tover of a touch driving period (non-contact touch driving period) within a frame period, the high level period HP may include an overdriving period OP and a normal high level period NHP.

During a second driving period Tnormal of a touch driving period (non-contact touch driving period) within a frame period, the high level period HP may solely include a normal high level period NHP.

Referring to FIG. 16B, in connection with the driving signal Vh supplied to multiple touch sensors TS during a non-contact touch driving period within a frame period, the normal high level period NHP may have a driving voltage Vd which is higher than the reference voltage Vo by a predetermined voltage (voltage necessary for touch sensing).

In connection with the driving signal Vh supplied to multiple touch sensors TS during a first driving period Tover of a touch driving period (non-contact touch driving period) within a frame period, the overdriving period OP may have an overdriving driving voltage Vd+Vover which is higher than the driving voltage Vd by the overdriving voltage Vover.

Figure 16C:
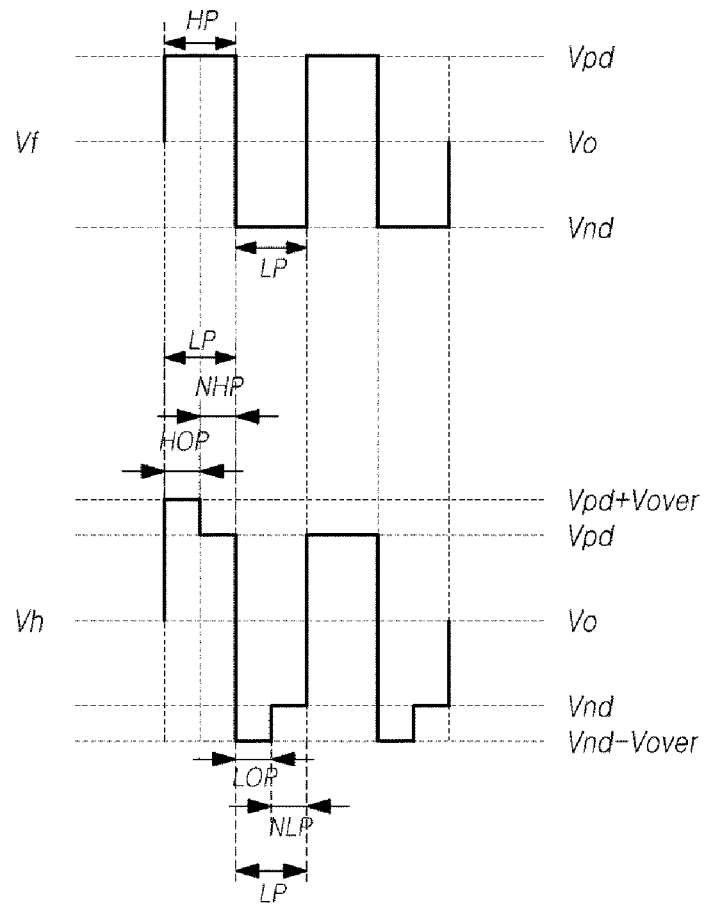

As in the case of still another example illustrated in FIG. 16C, a driving signal generated and output from the touch sensing circuit 100 may vary depending on the touch driving mode (contact touch driving mode, non-contact touch driving mode).

Referring to FIG. 16C, the driving signal Vf supplied to multiple touch sensors TS in the case of contact touch driving may be a modulation pulse having a repeated low level period LP and a repeated high level period HP.

In connection with the driving signal Vf supplied to multiple touch sensors TS in the case of contact touch driving, the high level period HP may be a normal high level period NHP, which has a high level driving voltage Vpd higher than the reference voltage Vo, and the low level period LP may be a normal low level period NLP, which has a low level driving voltage Vnd lower than the reference voltage Vo.

Referring to FIG. 16C, the driving signal Vh supplied to multiple touch sensors TS in the case of non-contact touch driving may be a modulation pulse having a repeated low level period LP and a repeated high level period HP.

Referring to FIG. 16C, in connection with the driving signal Vh supplied to multiple touch sensors TS in the case of non-contact touch driving, the high level period HP may include a high level overdriving period HOP and a normal high level period NHP.

In this regard, in connection with the high level period HP of the driving signal Vh supplied to multiple touch sensors TS in the case of non-contact touch driving, the high level overdriving period HOP has a high level overdriving driving voltage Vpd+Vover, which is higher than the high level driving voltage Vpd by the overdriving voltage Vover.

In addition, in connection with the high level period HP of the driving signal Vh supplied to multiple touch sensors TS in the case of non-contact touch driving, the normal high level period NHP may have a high level driving voltage Vpd, which is higher than the reference voltage Vo by a voltage necessary for touch sensing.

In connection with the driving signal Vh supplied to multiple touch sensors TS in the case of non-contact touch driving, the low level period LP may include a low level overdriving period LOP and a normal low level period NLP.

In this regard, in connection with the low level period LP of the driving signal Vh supplied to multiple touch sensors TS in the case of non-contact touch driving, the low level overdriving period LOP has a low level overdriving driving voltage Vnd-Vover, which is lower than the low level driving voltage Vnd by the overdriving voltage Vover.

In addition, in connection with the low level period LP of the driving signal Vh supplied to multiple touch sensors TS in the case of non-contact touch driving, the normal low level period NLP may have a low level driving voltage Vnd, which is lower than the reference voltage Vo.

Figure 16D:
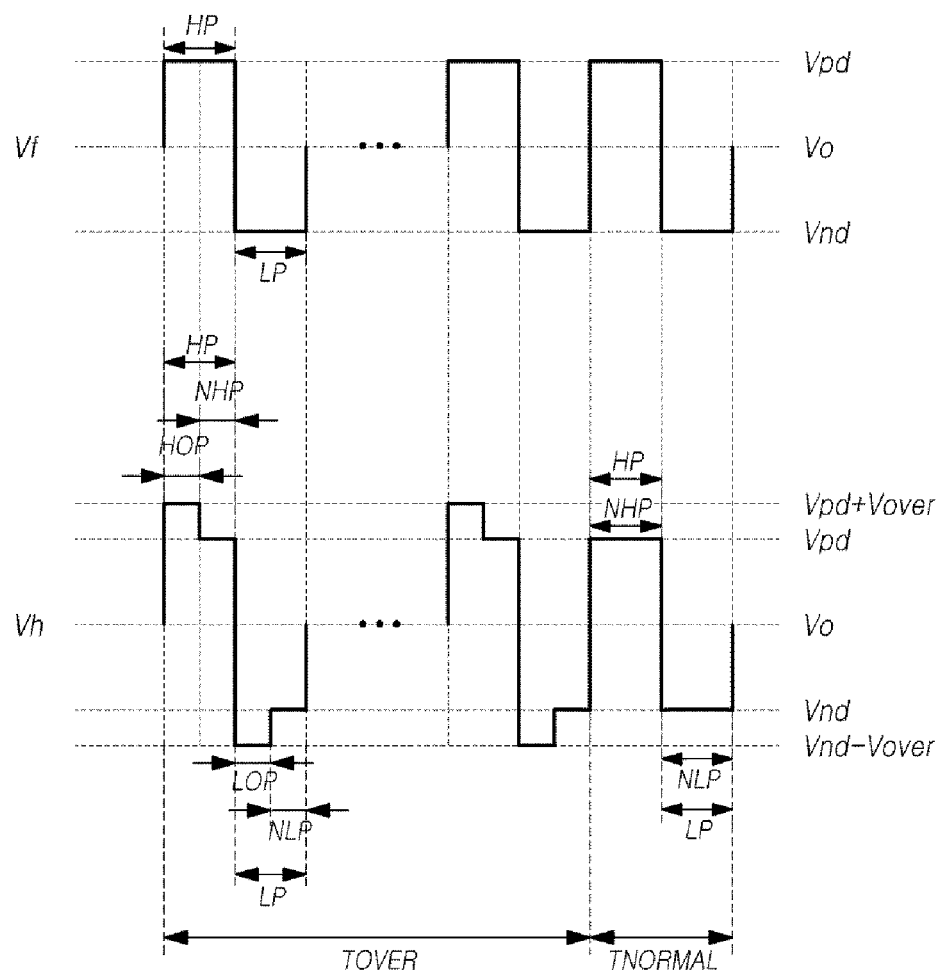

As in the case of still another example illustrated in FIG. 16D, a driving signal generated and output from the touch sensing circuit 100 may vary depending on the touch driving mode (contact touch driving mode, non-contact touch driving mode).

Referring to FIG. 16D, the driving signal Vf supplied to multiple touch sensors TS in the case of contact touch driving may be a modulation pulse having a repeated low level period LP and a repeated high level period HP.

In connection with the driving signal Vf supplied to multiple touch sensors TS in the case of contact touch driving, the high level period HP may be a normal high level period NHP, which has a high level driving voltage Vpd higher than the reference voltage Vo, and the low level period LP may be a normal low level period NLP, which has a low level driving voltage Vnd lower than the reference voltage Vo.

Referring to FIG. 16D, the driving signal Vh supplied to multiple touch sensors TS in the case of non-contact touch driving may be a modulation pulse having a repeated low level period LP and a repeated high level period HP.

Referring to FIG. 16D, during a first driving period Tover of a non-contact touch driving period, the high level period HP may include a high level overdriving period HOP and a normal high level period NHP, and the low level period LP may include a low level overdriving period LOP and a normal low level period NLP.

Referring to FIG. 16D, during a second driving period Tnormal of the non-contact touch driving period, the high level period HP may solely include a normal high level period NHP, and the low level period LP may solely include a normal low level period NLP.

The high level overdriving period HOP may have a high level overdriving driving voltage Vpd+Vover, which is higher than the high level driving voltage Vpd by the overdriving voltage Vover, and the normal high level period NHP may have a high level driving voltage Vpd, which is higher than the reference voltage Vo.

The low level overdriving period LOP may have a low level overdriving driving voltage Vnd-Vover, which is lower than the low level driving voltage Vnd by the overdriving voltage Vover, and the normal low level period NLP may have a low level driving voltage Vnd, which is lower than the reference voltage Vo.

As described above, the multiple touch sensors TS may be supplied with a display driving voltage (for example, a common voltage that corresponds to a pixel voltage and forms an electric field) during a display driving period, may be supplied with a contact touch driving signal Vf during a contact touch driving period, and may be supplied with a non-contact touch driving signal Vh during a non-contact touch driving period.

Figure 17:
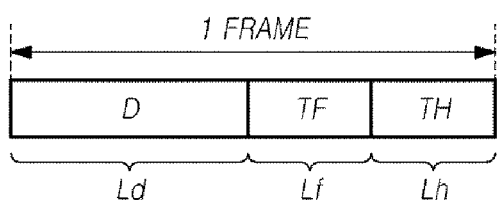
FIG. 17 is a driving timing diagram when a frame period proceeds in a time division scheme, i.e. as a display driving period, a contact touch driving period, and a non-contact touch driving period, during driving of a display device according to the present invention.

FIG. 17 is a driving timing diagram when a frame period proceeds in a time division scheme, i.e. as a display driving period D, a contact touch driving period TF, and a non-contact touch driving period TH, during driving of a display device according to the present invention.

Referring to FIG. 17, one frame (1 Frame) period may be time-divided into a display driving period D, a contact touch driving period TF, and a non-contact touch driving period TH.

Each of the display driving period D, the contact touch driving period TF, and the non-contact touch driving period TH, into which one frame (1 Frame) has been time-divided, may have the same length (Ld=Lf=Lh), or at least one period may have a different time length (at least one of Ld, Lf, and Lh having a different value).

Figure 18:
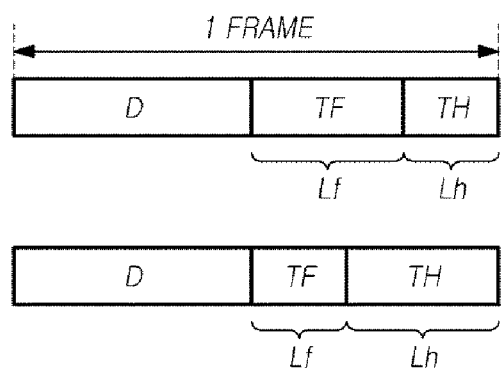
FIG. 18 is a diagram illustrating length-variable characteristics of a contact touch driving period and a non-contact touch driving period when a frame period proceeds in a time division scheme, i.e. as a display driving period, a contact touch driving period, and a non-contact touch driving period, during driving of a display device according to the present invention.

FIG. 18 is a diagram illustrating length-variable characteristics when a frame period proceeds in a time division scheme, i.e. as a display driving period D, a contact touch driving period TF, and a non-contact touch driving period TH, during driving of a display device according to the present invention.

Referring to FIG. 18, during image display driving, the time length Lf of the contact touch driving period TF and the time length Lh of the non-contact touch driving period TH may vary adaptively with regard to each other.

For example, in the case of a situation having frequently occurring contact touches, the time length Lf of the contact touch driving period TF may be controlled to be long, while the time length Lh of the non-contact touch driving period TH may be controlled to be short.

In the case of a situation having frequently occurring non-contact touches, as another example, the time length Lf of the contact touch driving period TF may be controlled to be short, while the time length Lh of the non-contact touch driving period TH may be controlled to be long.

Figure 19:
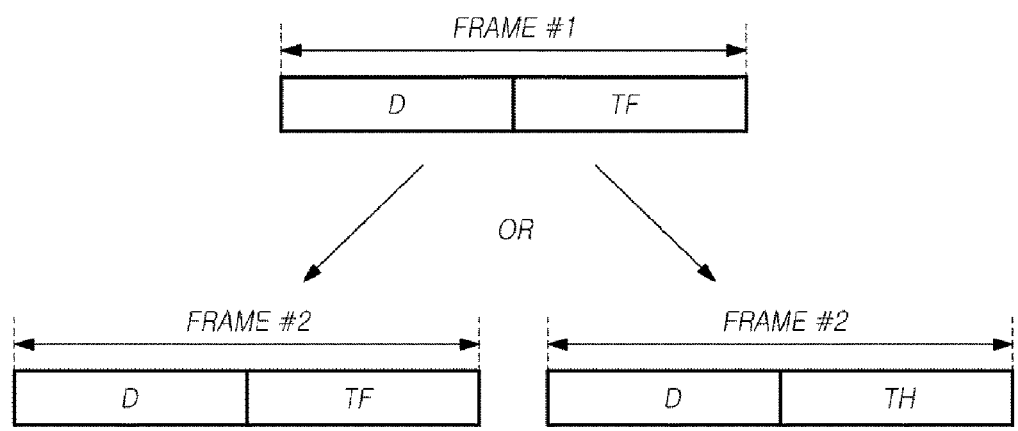
FIG. 19 is a driving timing diagram when a frame period is time-divided into a display driving period and a touch driving period, during driving of a display device according to the present invention, and the touch driving period proceeds as one of a contact touch driving period and a non-contact touch driving period.

FIG. 19 is a driving timing diagram when a frame period is time-divided into a display driving period D and a touch driving period, during driving of a display device according to the present invention, and the touch driving period proceeds as one of a contact touch driving period TF and a non-contact touch driving period TH.

Referring to FIG. 19, one frame period may be time-divided into a display driving period D and a contact touch driving period TF, or may be time-divided into a display driving period D and a non-contact touch driving period TH.

When it is determined that, after a contact touch driving period TF within a first frame Frame #1, a contact touch exists, the second frame Frame #2, which follows the first frame Frame #1, may be time-divided into a display driving period D and a contact touch driving period TF.

When it is determined that no contact touch exists, the second frame Frame #2, which follows the first frame Frame #1, may be time-divided into a display driving period D and a non-contact driving period TH.

Figure 20:
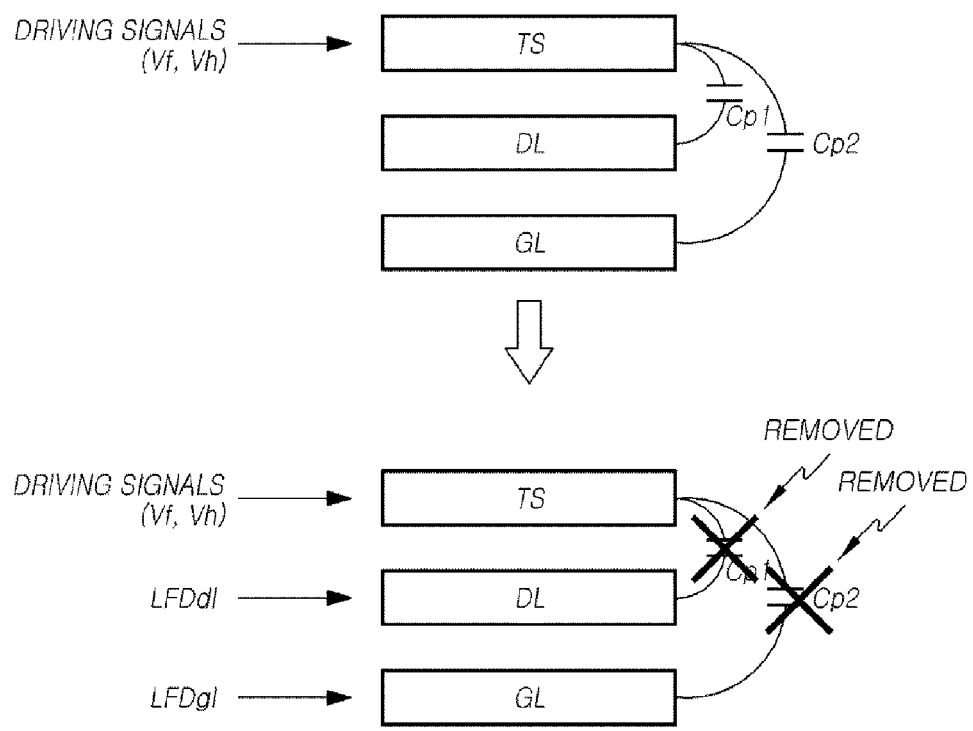
FIG. 20 is a diagram illustrating a parasitic capacitor generated during touch driving of a display device according to the present invention and a load-free driving scheme for improving touch sensing errors resulting therefrom.

FIG. 20 is a diagram illustrating parasitic capacitors Cp1 and Cp2, which occur during driving of a display device according to the present invention, and a load-free driving (LFD) scheme, which is a driving scheme capable of improving touch sensing accuracy by removing unnecessary parasitic capacitances Cp1 and Cp2, for the purpose of improving touch sensing errors resulting from the same.

The above-mentioned load-free driving (LFD) may be defined as driving for removing any load that degrades the touch sensing accuracy. The load-free driving may proceed together with main touch driving, which successively applies a driving signal to multiple touch sensors TS for the purpose of touch sensing.

In this regard, the load that degrades the touch sensing accuracy is generated by a parasitic capacitance which is unnecessarily formed, while a driving signal is successively applied to multiple touch sensors TS to conduct touch driving, between other patterns (for example, data lines and gate lines) inside the display panel 10 and multiple touch sensors TS, besides the capacitance between the pointer and a touch sensor TS, which must be formed for touch sensing. Such a parasitic capacitance, in the case of a scheme that conducts touch sensing on the basis of the amount of change of capacitance, may vary the amount of change of capacitance, thereby degrading the sensing accuracy.

Referring to FIG. 20, while driving signals Vf and Vh are supplied to a touch sensor TS during touch driving, a parasitic capacitor Cp1 may be formed between the touch sensor TS and a data line DL, and a parasitic capacitor Cp2 may be formed between the touch sensor TS and a gate line GL.

Such parasitic capacitors Cp1 and Cp2 act as loads in connection with touch driving and touch sensing, and may cause touch sensing errors.

In this regard, the present invention may provide a touch driving method capable of reducing loads by removing unnecessary parasitic capacitances CP1 and CP2.

According to a load-free touch driving method according to the present invention, while a driving signal is supplied to multiple touch sensors TS, a load-free driving signal LFDdl, which has the same phase as driving signals Vf and Vh, may be supplied to at least one data line DL arranged on the display panel 10.

According to a load-free touch driving method according to the present invention, while a driving signal is supplied to multiple touch sensors TS, a load-free driving signal LFDgl, which has the same phase as driving signals Vf and Vh, may be supplied to at least one gate line GL arranged on the display panel 10.

In this regard, the load-free driving signals LFDdl and FLDgl may have signal amplitudes and signal shapes corresponding to signal amplitudes and signal shapes of driving signals Vf and Vh, which are related to a case of non-contact touch driving and a case of contact touch driving, respectively.

Accordingly, during the touch driving periods TF and TH, the difference in electric potential between the touch sensors TS and the data lines DL and the difference in electric potential between the touch sensors TS and the gate lines GL may be reduced or eliminated, thereby reducing or removing the parasitic capacitance Cp1 between the touch sensors TS and the data lines DL and the parasitic capacitance Cp2 between the touch sensors TS and the gate lines GL. As a result, the sensing accuracy may be improved.

The touch sensing circuit 100 according to the present invention may be implemented as a separate touch integrated circuit.

In some cases, the touch sensing circuit 100 according to the present invention may be an internal circuit of a data driving circuit 24 implemented as a data driving integrated circuit chip.

Hereinafter, a data driving circuit 24, when a touch sensing circuit 100 is included inside the data driving circuit 24, will be described briefly with reference to FIG. 21 to FIG. 23.

Figure 21:
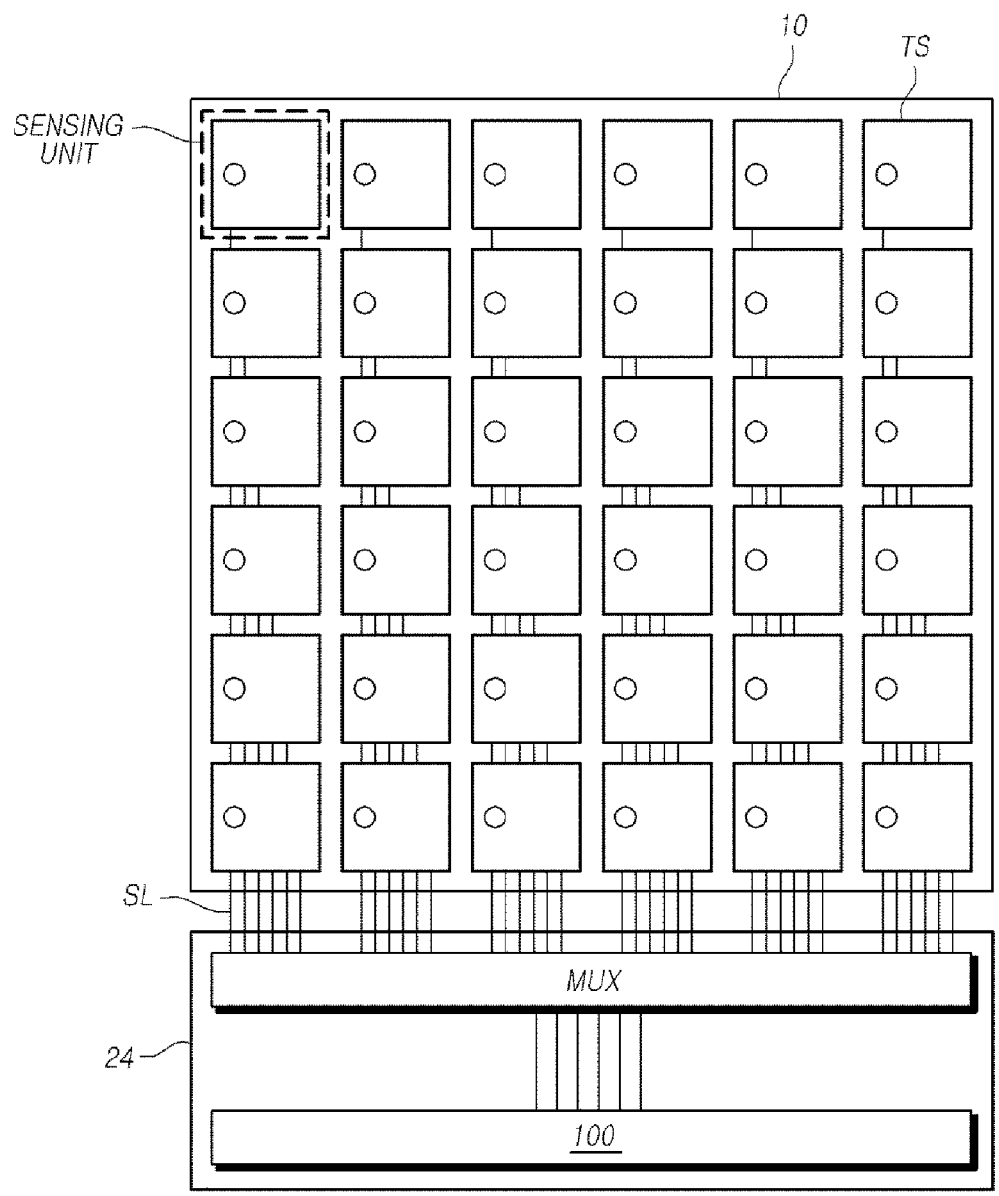
FIG. 21 and FIG. 22 are diagrams illustrating touch sensing devices having touch sensing circuits included in data driving circuits, respectively, according to the present invention.
Figure 22:
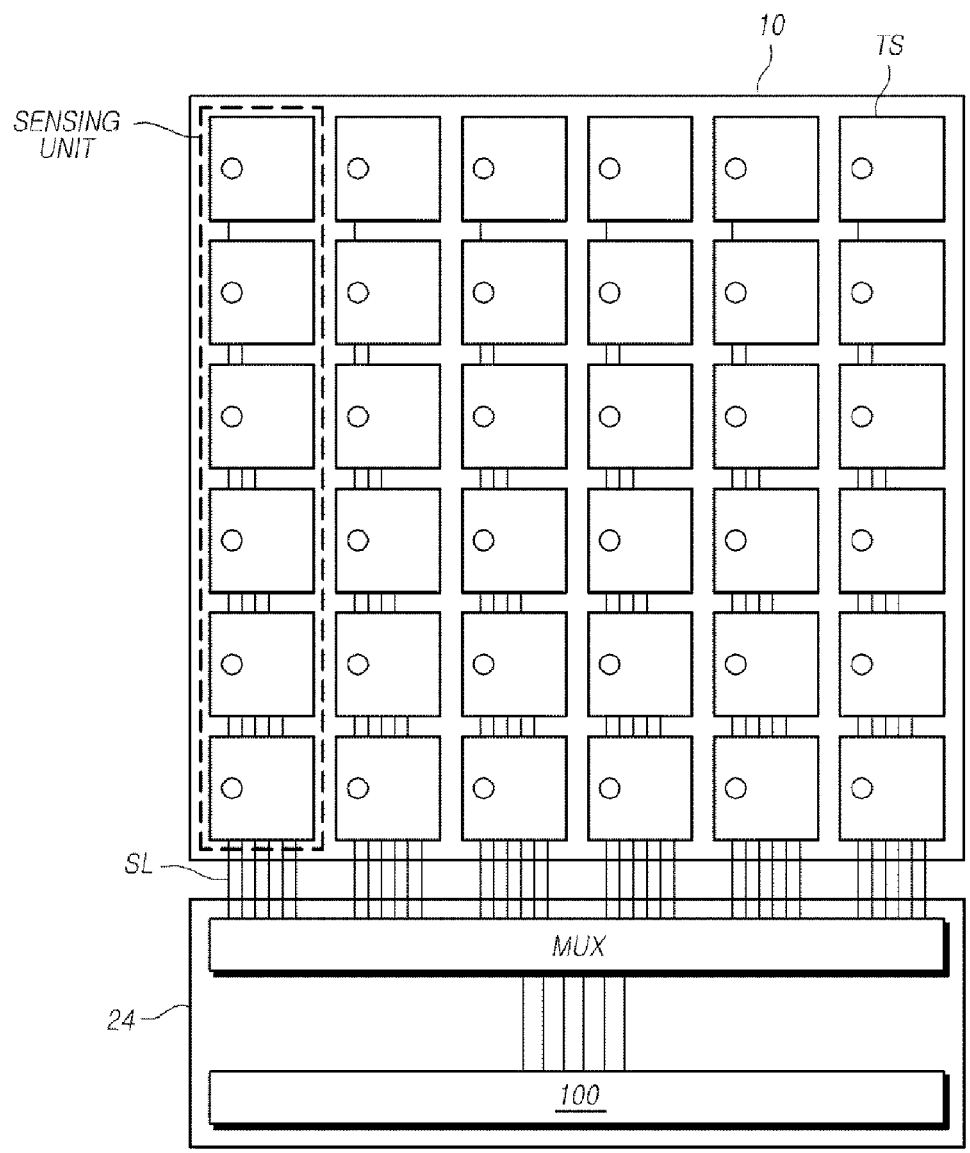

Referring to FIG. 21 and FIG. 22, the data driving circuit 24 may include, besides a data driving unit (not illustrated), one touch sensing circuit 100 and one multiplexer MUX.

Figure 23:
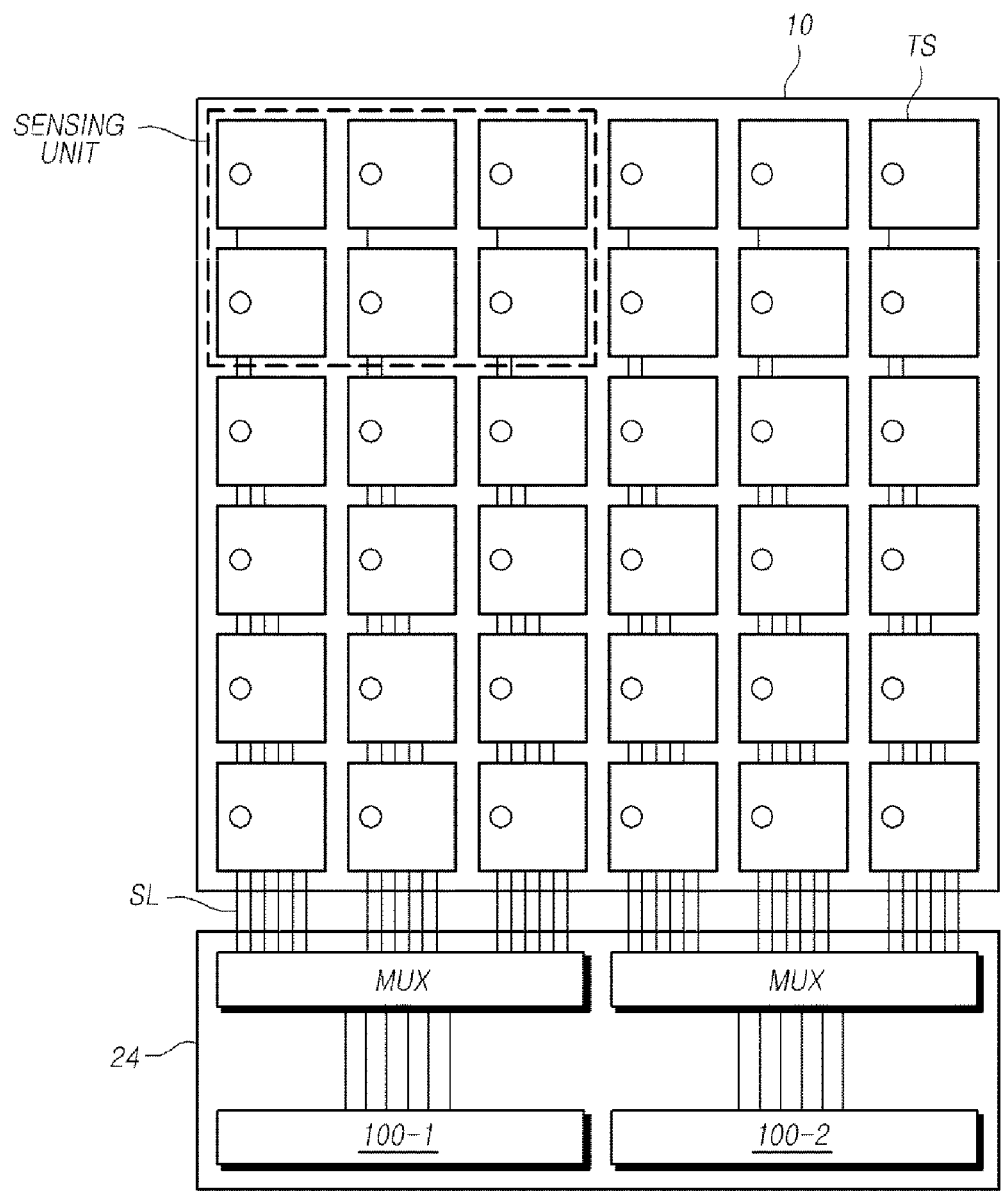
FIG. 23 is a diagram illustrating a touch sensing device having two or more touch sensing circuits included in a data driving circuit according to the present invention.

Referring to FIG. 23, the data driving circuit 24 may include, besides a data driving unit (not illustrated), two or more touch sensing circuits 100-1 and 100-2 and two or more multiplexers MUX.

Referring to FIG. 21 to FIG. 23, the data driving circuit 24 according to the present invention may be electrically connected to multiple data lines arranged on a display panel 10, and may be electrically connected to multiple touch sensors TS, which are arranged on the display panel 10, through multiple sensing lines SL.

The data driving circuit 24 according to the present invention may output a data voltage to the multiple data lines during a display driving mode and may successively supply a driving signal to the multiple touch sensors TS during a touch driving mode.

The data driving circuit 24 according to the present invention may supply a driving signal Tf to one touch sensor TS at a specific timing, in the case of contact touch driving, and may supply a driving signal Th to two or more touch sensors TS at a specific timing, in the case of non-contact touch driving.

The data driving circuit 24 according to the present invention may supply, in the case of non-contact touch driving, a driving signal having a signal amplitude larger than in the case of contact touch driving.

The data driving circuit 24 according to the present invention may include one or more multiplexers MUX, which conduct a switching operation to electrically connect one or more sensing lines among multiple sensing lines SL with the touch sensing circuit 100, such that a driving signal can be applied to one or more touch sensors TS among multiple touch sensors TS during a touch driving mode.

The data driving circuit 24 according to the present invention may further include one or more multiplexers of a different kind, which conduct switching such that, during a display driving mode, a common voltage is supplied to multiple touch sensors TS and, during a touch driving mode, a driving signal is successively supplied to multiple touch sensors TS.

The data driving circuit 24 according to the present invention may supply, while a driving signal Vf or Vh is successively supplied to multiple touch sensors TS, a load-free driving signal LFDdl, which has the same phase as the driving signal Vf or Vh, to at least one data line DL arranged on the display panel 10.

The data driving circuit 24 according to the present invention is electrically connected to multiple data lines DL arranged on the display panel 10 and is electrically connected to multiple touch sensors TS, which are arranged on the display panel 10, through multiple sensing lines; the data driving circuit 24 may output a data voltage to the multiple data lines DL during a display driving mode and may successively supply a driving signal Vh to the multiple touch sensors TS during a touch driving mode in such a manner that a driving signal Vh having an overdriving period OP is supplied to two or more touch sensors TS at a specific timing.

In this regard, the two or more touch sensors TS, to which a driving signal Vh having an overdriving period OP is supplied, may be touch sensors arranged adjacent to each other.

The two or more touch sensors TS, to which a driving signal Vh having an overdriving period OP is supplied, may be touch sensors arranged to be adjacent in the sensing line direction.

The two or more touch sensors TS, to which a driving signal Vh having an overdriving period OP is supplied, may be touch sensors arranged to be adjacent in a direction different from the sensing line direction.

The data driving circuit 24 according to the present invention is electrically connected to multiple data lines DL arranged on the display panel 10 and is electrically connected to multiple touch sensors TS arranged on the display panel 10; the data driving circuit 24 may output a data voltage to the multiple data lines DL during a display driving mode and may successively supply a driving signal to the multiple touch sensors TS during touch driving, thereby detecting whether a touch has occurred or not.

The data driving circuit 24 according to the present invention may detect whether a touch has occurred or not with regard to each sensing area, which corresponds to one touch sensor TS, as illustrated in FIG. 21, in the case of contact touch driving.

The data driving circuit 24 according to the present invention may detect whether a touch has occurred or not with regard to each sensing block, which corresponds to two or more touch sensors TS, as illustrated in FIG. 22 and FIG. 23, in the case of non-contact touch driving.

The data driving circuit 24 according to the present invention may supply, in the case of non-contact touch driving, a driving signal having a signal amplitude larger than in the case of contact touch driving.

Figure 24:
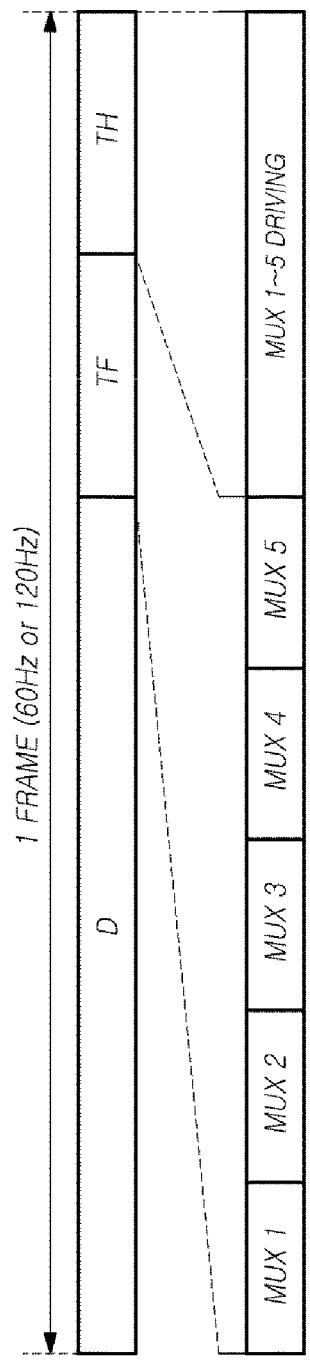
FIG. 24 is a diagram illustrating multiplexer timing in connection with a touch sensing device according to the present invention.

FIG. 24 is a diagram illustrating driving timing related to multiple multiplexers MUX 1, MUX 2, ..., MUX 5 in connection with a touch sensing device according to the present invention.

FIG. 24 is a diagram illustrating, in connection with a case in which a touch sensing device according to the present invention includes five multiplexers MUX 1, MUX 2, ..., MUX 5, how the five multiplexers MUX 1, MUX 2, ..., MUX 5 are used during each of a display driving period D, a contact touch driving period TF, and a non-contact touch driving period TH, into which one frame period has been time-divided.

Referring to FIG. 24, during the display driving period D, the five multiplexers MUX 1, MUX 2, ..., MUX 5 perform switching operations such that a common voltage Vcom is applied to all of the multiple touch sensors TS.

Referring to FIG. 24, during the contact touch driving period TF, the five multiplexers MUX 1, MUX 2, ..., MUX 5 operate successively, and the operating multiplexers perform switching operations such that a driving signal is successively applied to multiple touch electrodes TS corresponding to them.

Referring to FIG. 24, during the non-contact touch driving period TH, one or at least two of the five multiplexers MUX 1, MUX 2, ..., MUX 5 may be driven.

Figure 25:
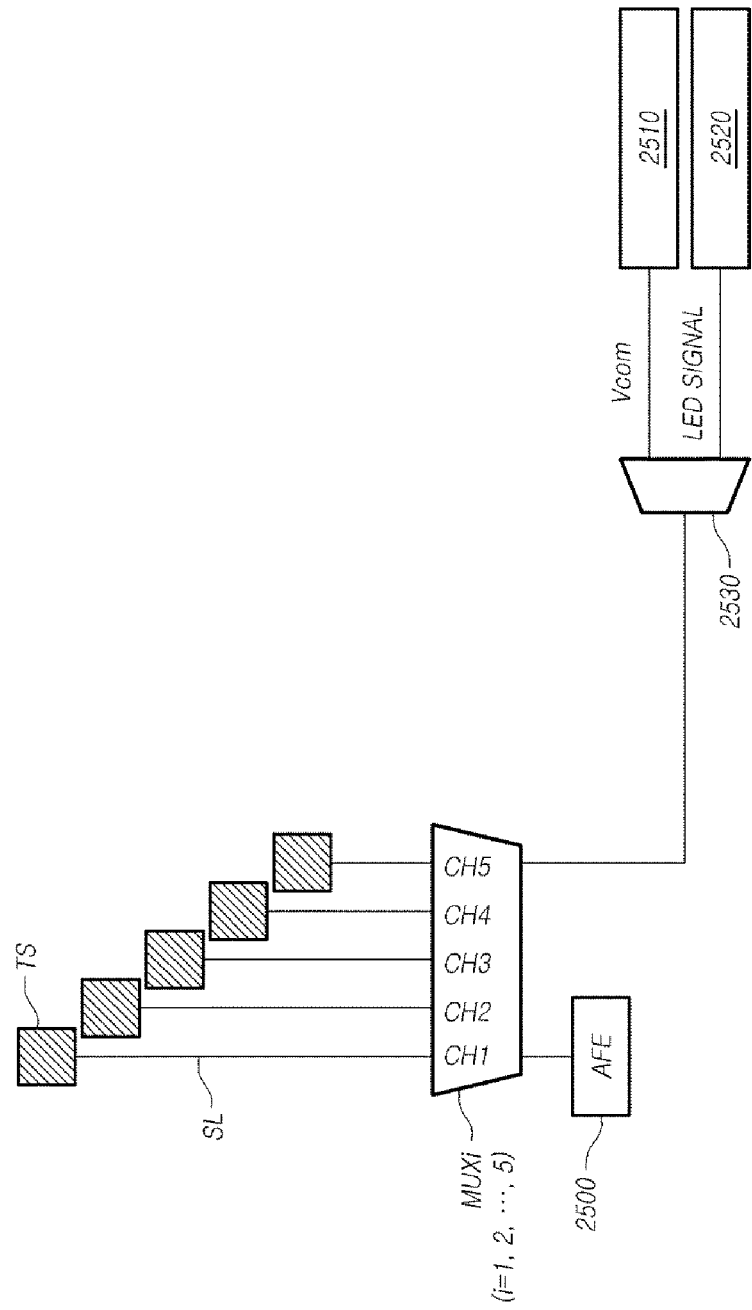
FIG. 25 is a diagram illustrating the operation of a multiplexer in connection with a touch sensing device according to the present invention.

FIG. 25 is a diagram illustrating operations of a multiplexer MUX i (i=1, 2, ..., 5) in connection with a touch sensing device according to the present invention.

Referring to FIG. 25, each multiplexer MUX i (i=1, 2, ..., 5) of the five multiplexers MUX 1, MUX 2, ..., MUX 5 performs an operation conforming to each of the display driving period D, the contact touch driving period TF, and the non-contact touch driving period TH.

Each multiplexer MUX i (i=1, 2, ..., 5) has five channels CH1, CH2, ..., CH5. Specifically, each multiplexer MUX i (i=1, 2, ..., 5) may be electrically connected to five touch sensors TS via five sensing lines SL.

Referring to FIG. 25, during the display driving period D, each multiplexer MUX i (i=1, 2, ..., 5) short-circuits five channels CH1-CH5 and supplies all of the five touch sensors TS with a common voltage Vcom, which has been output from a common voltage application unit 2520 via a sub-multiplexer 2530, via five sensing lines SL.

Referring to FIG. 25, during the contact touch driving period TF, in connection with the corresponding multiplexer MUX i (i=1, 2, ..., 5) which operates according to the operating order, five channels CH1-CH5 are time-divided and become driving signal paths.

Referring to FIG. 25, during the contact touch driving period TF, the corresponding multiplexer MUX i (i=1, 2, ..., 5), which operates according to the operating order, selects one channel from the five channels CH1-CH5 and connects (short-circuits) the selected channel with an analog front end 2500. In this regard, the analog front end 2500 may be included inside the touch sensing circuit 100 or the data driving circuit 24 or may be included outside the same.

Accordingly, the corresponding multiplexer MUX i (i=1, 2, ..., 5), specifically the five channels CH1-CH5, supply the corresponding touch sensor TS with a driving signal, which has been output from the analog front end 2500, via a selected channel.

In this case, the corresponding multiplexer MUX i (i=1, 2, ..., 5) receives a load-free driving signal, which has been output from a load-free driving unit 2510, via a sub-multiplexer 2530 and supplies the input load-free driving signal to four corresponding touch sensors TS via the four remaining channels other than the selected channel.

Referring to FIG. 25, during the non-contact touch period TH, the corresponding multiplexer MUX i (i=1, 2, ..., 5) selects two or more channels from the five channels CH1-CH5, short-circuits the selected channels, and connects the two or more short-circuited channels to the analog front end 2500.

Accordingly, the corresponding multiplexer MUX i (i=1, 2, ..., 5) supplies the two or more touch sensors TS with a driving signal, which has been output from the analog front end 2500, via the two or more selected channels.

Therefore, the detailed descriptions should not be construed to be limited in all aspects, but should be considered to be an example. The scope of the present invention should be determined by rational interpretation of the appended claims, and all modifications within a range equivalent to the present invention should be construed as being included in the scope of the present invention.

What is claimed is:

1. A touch integrated display device, comprising:
    a display panel including a plurality of touch electrodes, the display panel operated in a display period of a frame or a touch period of the frame; and
    a touch driver circuit to provide a common voltage to the touch electrodes during the display period and to drive the touch electrodes with a touch drive signal during the touch period to detect a touch sensing signal responsive to a touch from the touch electrodes, wherein:
    in a first touch mode, the touch driver circuit drives a first number of the touch electrodes with the touch drive signal during the touch period, and
    in a second touch mode, the touch driver circuit drives a second number of the touch electrodes with the touch drive signal during the touch period, the second number of the touch electrodes being greater than the first number of the touch electrodes,
    wherein a load-free driving signal having a same phase or amplitude as the touch drive signal is driven to one or more data lines or one or more gate lines of the display panel, during the touch period while the touch driver circuit drives the second number of the touch electrodes with the touch drive signal in the second touch mode.

2. The touch integrated display device of claim 1, wherein the first touch mode is a contact touch mode in which the touch is a physical contact made with the touch integrated display device, and the second touch mode is a non-contact touch mode in which the touch does not make physical contact with the touch integrated display device but is within a predetermined distance from the touch integrated display device.

3. The touch integrated display device of claim 2, wherein the touch in the non-contact touch mode is hovering over the touch integrated display device.

4. The touch integrated display device of claim 1, wherein:
    in the first touch mode, the touch drive signal has a reference waveform; and
    in the second touch mode, the touch drive signal mimics the reference waveform but an amplitude of the touch drive signal in the second touch mode is overdriven by an overdrive amplitude with respect to the reference waveform during an overdrive duration.

5. The touch integrated display device of claim 4, wherein:
    the reference waveform is a pulse waveform periodically alternating between a high level and a low level, and
    touch drive signal in the second touch mode has pulses with two or more different high voltage levels during the high level and two or more different low voltage levels during the low level.

6. The touch integrated display device of claim 5, wherein:
    at least some of the pulses of the touch drive signal in the second touch mode are not overdriven.

7. The touch integrated display device of claim 4, wherein:
    the reference waveform is a pulse waveform periodically alternating between a high level and a low level, and
    the overdrive duration is as long as an entire width or a part of the width of a pulse of the pulse waveform.

8. The touch integrated display device of claim 1, wherein the touch period of the frame includes both a first touch period of the first touch mode and a second touch period of the second touch mode.

9. The touch integrated display device of claim 8, wherein the touch period of another frame subsequent to said frame includes the first touch period of the first touch mode but does not include the second touch period of the second touch mode, responsive to determining the touch in said frame is the physical contact touch in the first touch mode.

10. A driver circuit for driving a touch integrated display device, the touch integrated display device comprising a display panel including a plurality of touch electrodes, the display panel operated in a display period of a frame or a touch period of the frame, the driver circuit comprising:

circuitry to provide a common voltage to the touch electrodes during the display period and to drive the touch electrodes with a touch drive signal during the touch period to detect a touch sensing signal responsive to a touch from the touch electrodes, wherein:

in a first touch mode, the circuitry drives a first number of the touch electrodes with the touch drive signal during the touch period, and in a second touch mode, the circuitry drives a second number of the touch electrodes with the touch drive signal during the touch period, the second number of the touch electrodes being greater than the first number of the touch electrodes, wherein a load-free driving signal having a same phase or amplitude as the touch drive signal is driven to one or more data lines or one or more gate lines of the display panel, during the touch period while the circuitry drives the second number of the touch electrodes with the touch drive signal in the second touch mode.

11. The driver circuit of claim 10, wherein the first touch mode is a contact touch mode in which the touch is a physical contact made with the touch integrated display device, and the second touch mode is a non-contact touch mode in which the touch does not make physical contact with the touch integrated display device but is within a predetermined distance from the touch integrated display device.

12. The driver circuit of claim 11, wherein the touch in the non-contact touch mode is hovering over the touch integrated display device.

13. The driver circuit of claim 10, wherein:
in the first touch mode, the touch drive signal has a reference waveform; and
in the second touch mode, the touch drive signal mimics the reference waveform but an amplitude of the touch drive signal in the second touch mode is overdriven by an overdrive amplitude with respect to the reference waveform during an overdrive duration.

14. The driver circuit of claim 13, wherein:
the reference waveform is a pulse waveform periodically alternating between a high level and a low level, and
touch drive signal in the second touch mode has pulses with two or more different high voltage levels during the high level and two or more different low voltage levels during the low level.

15. The driver circuit of claim 14, wherein:
at least some of the pulses of the touch drive signal in the second touch mode are not overdriven.

16. The driver circuit of claim 13, wherein:
the reference waveform is a pulse waveform periodically alternating between a high level and a low level, and
the overdrive duration is as long as an entire width or a part of the width of a pulse of the pulse waveform.

17. The driver circuit of claim 10, wherein the touch period of the frame includes both a first touch period of the first touch mode and a second touch period of the second touch mode.

18. The driver circuit of claim 17, wherein the touch period of another frame subsequent to said frame includes only the first touch period of the first touch mode but does not include the second touch period of the second touch mode, responsive to determining that the touch in said frame is the physical contact touch in the first touch mode.

19. A method for driving a touch integrated display device, the touch integrated display device comprising a display panel including a plurality of touch electrodes, the display panel operated in a display period of a frame or a touch period of the frame, the method comprising:

providing a common voltage to the touch electrodes during the display period;

driving the touch electrodes with a touch drive signal during the touch period to detect a touch sensing signal responsive to a touch from the touch electrodes, wherein:

in a first touch mode, said driving the touch electrodes with a touch drive signal comprises driving a first number of the touch electrodes with the touch drive signal during the touch period, and in a second touch mode, said driving the touch electrodes with a touch drive signal comprises driving a second number of the touch electrodes with the touch drive signal during the touch period, the second number of the touch electrodes being greater than the first number of the touch electrodes, wherein a load-free driving signal having a same phase or amplitude as the touch drive signal is driven to one or more data lines or one or more gate lines of the display panel, during the touch period while the second number of the touch electrodes are driven with the touch drive signal in the second touch mode.

20. The method of claim 19, wherein the first touch mode is a contact touch mode in which the touch is a physical contact made with the touch integrated display device, and the second touch mode is a non-contact touch mode in which the touch does not make physical contact with the touch integrated display device but is within a predetermined distance from the touch integrated display device.

21. The method of claim 20, wherein the touch in the non-contact touch mode is hovering over the touch integrated display device.

22. The method of claim 19, wherein:
in the first touch mode, the touch drive signal has a reference waveform; and
in the second touch mode, the touch drive signal mimics the reference waveform but an amplitude of the touch drive signal in the second touch mode is overdriven by an overdrive amplitude with respect to the reference waveform during an overdrive duration.

23. The method of claim 22, wherein:
the reference waveform is a pulse waveform periodically alternating between a high level and a low level, and
touch drive signal in the second touch mode has pulses with two or more different high voltage levels during the high level and two or more different low voltage levels during the low level.

24. The method of claim 23, wherein:
at least some of the pulses of the touch drive signal in the second touch mode are not overdriven.

25. The method of claim 22, wherein:
the reference waveform is a pulse waveform periodically alternating between a high level and a low level, and
the overdrive duration is as long as an entire width or a part of the width of a pulse of the pulse waveform.

26. The method of claim 19, wherein the touch period of the frame includes both a first touch period of the first touch mode and a second touch period of the second touch mode.

27. The method of claim 26, wherein the touch period of another frame subsequent to said frame includes only the first touch period of the first touch mode but does not include the second touch period of the second touch mode, responsive to determining that the touch in said frame is the physical contact touch in the first touch mode.

* * * * *